US010555361B2

(12) United States Patent
Futaki et al.

(10) Patent No.: US 10,555,361 B2
(45) Date of Patent: *Feb. 4, 2020

(54) RADIO COMMUNICATION SYSTEM, RADIO STATION, RADIO TERMINAL, COMMUNICATION CONTROL METHOD, AND NON-TRANSITORY COMPUTER READABLE MEDIUM

(71) Applicant: NEC Corporation, Tokyo (JP)

(72) Inventors: Hisashi Futaki, Tokyo (JP); Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,835

(22) Filed: Dec. 27, 2018

(65) Prior Publication Data

US 2019/0132898 A1 May 2, 2019

Related U.S. Application Data

(63) Continuation of application No. 14/767,098, filed as application No. PCT/JP2014/000455 on Jan. 29, 2014, now Pat. No. 10,206,242.

(30) Foreign Application Priority Data

Feb. 28, 2013 (JP) .................. 2013-038971

(51) Int. Cl.
*H04W 76/19* (2018.01)
*H04L 5/00* (2006.01)
(Continued)

(52) U.S. Cl.
CPC .............. *H04W 76/19* (2018.02); *H04B 7/24* (2013.01); *H04L 5/001* (2013.01); *H04W 4/30* (2018.02);
(Continued)

(58) Field of Classification Search
None
See application file for complete search history.

(56) References Cited

U.S. PATENT DOCUMENTS

2006/0153085 A1 7/2006 Willins et al.
2010/0165836 A1 7/2010 Wahlqvist et al.
(Continued)

FOREIGN PATENT DOCUMENTS

EP 2466936 A1 6/2012
EP 2677798 A1 12/2013
(Continued)

OTHER PUBLICATIONS

3GPP RSW-120046 Technologies for Rel-12 and Onwards, #GPP TSG RAN Workshop on Rel-12 and Onwards, Ljubljana, Slovenia, Jun. 11-12, 2012; (3 pages).
(Continued)

*Primary Examiner* — Jamaal Henson
(74) *Attorney, Agent, or Firm* — Wilmer Cutler Pickering Hale and Dorr LLP

(57) ABSTRACT

A radio terminal (3) can perform carrier aggregation using a first cell (10) of a first radio station (1) and a second cell (20) of a second radio station (2). The first radio station (1) performs, with the radio terminal (3), radio resource control for the first cell (10) and the second cell (20) in order to perform the carrier aggregation. At least one of the second radio station (2) and the radio terminal (3) is configured to transmit, to the first radio station (10), information about a problem occurring in a radio link in the second cell (20) between the second radio station (20) and the radio terminal (30) while the carrier aggregation of the first cell (10) and the second cell (20) is being performed.

15 Claims, 10 Drawing Sheets

(51) Int. Cl.
| | |
|---|---|
| *H04W 24/04* | (2009.01) |
| *H04W 48/04* | (2009.01) |
| *H04B 7/24* | (2006.01) |
| *H04W 16/24* | (2009.01) |
| *H04W 4/30* | (2018.01) |
| *H04L 1/00* | (2006.01) |

(52) U.S. Cl.
CPC ........... *H04W 16/24* (2013.01); *H04W 24/04* (2013.01); *H04W 48/04* (2013.01); *H04L 5/0069* (2013.01); *H04L 5/0098* (2013.01); *H04L 2001/0093* (2013.01)

(56) References Cited

U.S. PATENT DOCUMENTS

| | | | |
|---|---|---|---|
| 2010/0173626 | A1 | 7/2010 | Catovic et al. |
| 2010/0265847 | A1 | 10/2010 | Lee et al. |
| 2011/0021154 | A1 | 1/2011 | Marinier et al. |
| 2011/0077010 | A1 | 3/2011 | Xu et al. |
| 2011/0103221 | A1 | 5/2011 | Lee et al. |
| 2011/0117908 | A1 | 5/2011 | Huang et al. |
| 2012/0140743 | A1 | 6/2012 | Pelletier et al. |
| 2012/0157156 | A1 | 6/2012 | Han et al. |
| 2012/0276897 | A1 | 11/2012 | Kwon et al. |
| 2012/0281548 | A1* | 11/2012 | Lin ................. H04W 76/18 370/242 |
| 2013/0037342 | A1* | 2/2013 | Engdahl ............ G01V 1/159 181/157 |
| 2013/0039342 | A1 | 2/2013 | Kazmi |
| 2013/0153298 | A1* | 6/2013 | Pietraski .......... E21B 7/04 175/45 |
| 2013/0250881 | A1 | 9/2013 | Liao et al. |
| 2013/0315075 | A1 | 11/2013 | Tamura et al. |
| 2014/0112155 | A1 | 4/2014 | Lindoff et al. |
| 2014/0242989 | A1 | 8/2014 | Cai et al. |
| 2014/0378136 | A1 | 12/2014 | Park et al. |
| 2015/0223178 | A1 | 8/2015 | Pietraski et al. |
| 2015/0256300 | A1 | 9/2015 | Lin et al. |
| 2015/0373609 | A1 | 12/2015 | Kim et al. |
| 2016/0066364 | A1 | 3/2016 | Marinier et al. |
| 2017/0273036 | A1 | 9/2017 | Pietraski et al. |

FOREIGN PATENT DOCUMENTS

| | | |
|---|---|---|
| JP | 2012-516655 A | 7/2012 |
| WO | WO-2011/029292 | 3/2011 |
| WO | WO-2011/100673 A1 | 8/2011 |
| WO | WO-2012/019363 A1 | 2/2012 |
| WO | WO-2012/071704 A1 | 6/2012 |
| WO | WO-2012/074878 A2 | 6/2012 |
| WO | WO-2012/086769 A1 | 6/2012 |
| WO | WO-2014/111027 A1 | 7/2014 |

OTHER PUBLICATIONS

3GPP RWS-120010 DOCOMO, Requirements, Candidate Solutions & Technology Roadmap for LTE Rel-12 Onward, 3GPP Workshop on Release 12 and onwards, Ljubljana, Slovenia, Jun. 11-12, 2012; (27 pages).
3GPP TS 36.300 v11.3.0 (Sep. 2012) 3rd General Partnership Project; Technical Specification Group Radio Access Network; Evolved Universal Terrestrial Radio Access (E-UTRA) and Evolved Universal Terrestrial Radio Access Network (E-UTRAN); Overall description; State 2 (Release 11); (205 pages).
3GPP TS 36.311 V11.2.0 (Dec. 2012); 3rd Generation Partnership Project; Technical Specification Group Radio Access Network; Evolved Universal Terrestrial Radio Access (E-UTRA): Radio Resource Control (RRC): Protocol specification (Release 11); (340 pages).
3GPP TSG-RAN2 Meeting #72, RS-106573; Resolving Issues Related to Radio Link Monitoring on SCells, Nov. 15-19, 2010; (3 pages).
Extended European Search Report issued by the European Patent Office for Application No. 16163051.2 dated Jun. 28, 2016 (10 pages).
Extended European Search Report issued by the European Patent Office for European Application No. 18185346.6 dated Oct. 9, 2018 (10 pages).
Extended European Search Report issued in corresponding European Patent Application No. 14756549.3, dated Oct. 20, 2016, 10 pages.
International Search Report corresponding to PCT/JP2014/000455, dated Apr. 8, 2014; (2 pages).
ITRI, "Discussion about SCell Radio Link Monitoring," 3GPP TSG-RAN WG2, Meeting #72, R2- 106391, Agenda item 7.1.1.2, Jacksonville, Florida, 3 pages (Nov. 15-19, 2010).
Korean Office Action issued by the Korean Intellectual Property Office for Application No. 2015-7022107 dated Jul. 20, 2016 (11 pages).
Nokia, Nokia Siemens Networks,"Radio link monitoring for Scells," 3GPP TSG-RAN WG4 Meeting 2010AH#4, R4-103671, Agenda Item 4.1.1.5, Xi'an, China, Oct. 11-15, 2010 (3 pages).
NTT DOCOMO, Inc., "Necessity of C-plane architecture enhancements for dual connectivity," 3GPP TSG-RAN2, Meeting #81, R2-130488, St. Julian's, Malta, 4 pages (Jan. 28-Feb. 1, 2013).
U.S. Office Action issued by the U.S. Patent and Trademark Office for U.S. Appl. No. 15/584,855 dated Apr. 23, 2018 (21 pages).
U.S. Office Action issued by the U.S. Patent and Trademark Office for U.S. Appl. No. 14/767,098 dated Feb. 27, 2018 (13 pages).
U.S. Office Action issued by the U.S. Patent and Trademark Office for U.S. Appl. No. 14/767,098 dated Jul. 19, 2017 (12 pages).
Japanese Notice of Reasons for Refusal issued in Japanese Patent Application No. 2018-094749, dated Aug. 6, 2019, 7 pages.
Samsung "ASN/1 Review Issues on Various Topics", 3GPP TSG-RAN2 Ad Hoc, Tdoc-R2-130038, Bonn, Germany, Jan. 9-10, 2013, 11 pages.
InterDigital Communications "Scenarios for Dual Connectivity with Small Cell Deployments", 3GPP TSG-RAN WG2 #81, Tdoc-R2-130517, St. Julian's, Malta Jan. 28-Feb. 1, 2013, pp. 1-4 (4 pages).
USPTO Notice of Allowance and Fee(s) Due issued in U.S. Appl. No. 15/584,855, dated Jul. 29, 2019, 61 pages.

\* cited by examiner though ``deactivation''. Non-Access Stratum (NAS) mobility
RADIO COMMUNICATION SYSTEM, RADIO STATION, RADIO TERMINAL, COMMUNICATION CONTROL METHOD, AND NON-TRANSITORY COMPUTER READABLE MEDIUM

CROSS-REFERENCE TO RELATED APPLICATIONS

The present application is a continuation patent application of U.S. patent application Ser. No. 14/767,098, filed Aug. 11, 2015, which is a national stage application of International Application No. PCT/JP2014/000455 entitled "RADIO COMMUNICATION SYSTEM, RADIO STATION, RADIO TERMINAL, COMMUNICATION CONTROL METHOD, AND NON-TRANSITORY COMPUTER READABLE MEDIUM," filed on Jan. 29, 2014, which claims the benefit of the priority of Japanese Patent Application No. 2013-038971, filed on Feb. 28, 2013, the disclosures of each of which are hereby incorporated by reference in their entirety.

TECHNICAL FIELD

The present invention relates to a radio communication system in which a radio station communicates with a radio terminal by using a plurality of cells.

BACKGROUND ART

In order to improve the degradation of communication quality due to drastic increases in mobile traffic in recent years and achieve faster communication, the standardization of Carrier Aggregation (CA) functions that enable a radio terminal (User Equipment (UE)) to communicate with a radio base station (eNode B (eNB)) by using a plurality of cells has been undertaken in the 3GPP Long Term Evolution (LTE). Note that the cells that a UE (User Equipment) can use in CA are limited to a plurality of cells of one eNB (i.e., a plurality of cells served by one eNB).

The cells that are used by a UE in CA are categorized into a Primary Cell (PCell) that has already been used as a serving cell when the CA is started and a Secondary Cell(s) (SCell(s)) that is used in addition to the PCell or in dependence thereon. Each SCell can be used by a UE as the need arises, and the use of them can be stopped. Note that starting the use of an SCell is called "activating" or "activation". Similarly, stopping the use of an SCell is called "deactivating" or "deactivation". Non-Access Stratum (NAS) mobility information, security information (security input) and the like are transmitted and received through a PCell during radio connection (re)-establishment (RRC connection Establishment/Re-establishment) (see Non-patent Literature 1). A downlink (DL) Carrier and an uplink (UL) Carrier corresponding to a PCell are called "DL Primary Component Carrier (PCC)" and "UL PCC", respectively. Similarly, a DL Carrier and a UL Carrier corresponding to a SCell are called "DL Secondary Component Carrier (SCC)" and "UL SCC", respectively.

A radio link recovery procedure that is performed when radio link disconnection (Radio Link Failure (RLF)) occurs in a radio link in a PCell during downlink data (DL data) transmission in CA is explained with reference to FIG. 10 (Non-patent Literature 2). Here, it is assumed that a UE uses a first cell (Cell1) served by an eNB as a PCell and uses a second cell (Cell2) as an SCell.

In steps S1 and S2, the eNB transmits DL data to the UE by using the PCell (Cell1) and the SCell (Cell2). In a step S3, the quality of the radio link in the PCell deteriorates and the DL data transmission from the eNB to the UE fails. In a step S4, the UE detects the RLF in the PCell (Cell1). In a step S5, the UE transmits a request for the reconnection of the radio link in the PCell (Cell1) (RRC Connection Reestablishment Request). In a step S6, the UE releases the SCell (Cell2) (SCell (Cell2) release). In a step S7, the eNB transmits a response to the reconnection request through the PCell (Cell1) (RRC Connection Reestablishment). In a step S8, the UE transmits a report about the completion of the reconnection through the PCell (Cell1) (RRC Connection Reestablishment Complete). As a result, the UE can receive DL data in the Cell1 again. In a step S9, the eNB transmits DL data to the UE by using the PCell (Cell1).

In FIG. 10, an example in which the UE detects the RLF is shown. However, when the eNB can detect the RLF before the UE does, the eNB may trigger the reconnection. As described above, in ordinary CA, the UE or the eNB can detect an RLF occurring in the PCell and reestablish the radio link connection. Accordingly, the eNB and the UE can resume data transmission, thus making it possible to minimize packet losses and the like caused by RLFs in the PCell. Note that, when the SCell (Cell2) needs to be used again after the completion of the reconnection, the eNB transmits configuration information for the SCell to the UE (RRC Connection Reconfiguration including SCell configuration) and also transmits to the UE a message indicating start of using the SCell (called "Activation").

CITATION LIST

Non Patent Literature

Non-patent Literature 1: 3GPP TS 36.300 V11.3.0, "Evolved Universal Terrestrial Radio Access (E-UTRA) and Evolved Universal Terrestrial Radio Access Network (E-UTRAN); Overall description; Stage 2 (Release 11)", Section 7.5, September 2012

Non-patent Literature 2: 3GPP TS 36.331 V11.2.0, "Evolved Universal Terrestrial Radio Access (E-UTRA); Radio Resource Control (RRC); Protocol specification (Release 11)", Section 5.3.7 and 5.3.11, December 2012

Non-patent Literature 3: 3GPP RWS-120046, Samsung Electronics, "Technologies for Rel-12 and Onwards", 3GPP TSG RAN Workshop on Rel-12 and Onwards, Ljubljana, Slovenia, 11-12 Jun. 2012

Non-patent Literature 4: 3GPP RWS-120010, NTT DOCOMO, "Requirements, Candidate Solutions & Technology Roadmap for LTE Rel-12 Onward", 3GPP TSG RAN Workshop on Rel-12 and Onwards, Ljubljana, Slovenia, 11-12 Jun. 2012

SUMMARY OF INVENTION

Technical Problem

In carrier aggregation (CA), providing a radio terminal (UE) with a function of detecting an RLF in the primary cell (PCell) enables the reconnection of the radio link. Note that the CA does not have a function of detecting an RLF occurring in the secondary cell (SCell). This is because the SCell is a supplementary cell, and thus no serious problem occurs for the communication as long as the radio link in the PCell is normally connected.

Meanwhile, inter-base station carrier aggregation (inter-eNB CA) in which cells of different radio base stations (eNBs) are simultaneously used has been proposed (Non-patent Literatures 3 and 4). For example, a cell of a macro base station (Macro eNB (MeNB)) and a cell of a low-power base station (Low Power Node (LPN)) are simultaneously used as a PCell and an SCell, respectively. In inter-base station (or inter-eNB) carrier aggregation, bearers are independently configured in the PCell and the SCell and communication is performed between an UE and the MeNB and between the UE and the LPN.

If the architecture of ordinary CA is applied to the inter-eNB CA, it is conceivable that an MeNB controls configuration of radio parameters and the like for both the PCell and the SCell in the inter-eNB CA. In this case, RLF detection in the PCell by the UE and the reconnection of the radio link in the PCell can be performed in a manner similar to that for the ordinary CA. However, RLF detection and accompanying radio-link reconnection in the SCell are not performed. Accordingly, the MeNB cannot recognize an RLF occurring in the SCell, thus causing a possibility that a state where communication (e.g., data transmission) is not properly carried out in the SCell continues. The continuation of the state where communication is not properly carried out in the SCell causes a possibility of occurrences of packet losses.

One of the objects of the present invention is to provide a radio communication system, a radio station, a radio terminal, a communication control method, and a program which are contribute to reduction of packet losses caused by an occurrence of a radio link problem (e.g., an RLF) in a secondary cell during carrier aggregation of a plurality of cells served by different radio stations.

Solution to Problem

In a first aspect, a radio communication system includes a first radio station that serves a first cell, a second radio station that serves a second cell, and a radio terminal capable of performing carrier aggregation of the first and second cells. The first radio station is configured to perform, with the radio terminal, radio resource control for the first and second cells in order to perform the carrier aggregation. At least one of the second radio station and the radio terminal is configured to transmit, to the first radio station, information about a radio link problem occurring in a radio link in the second cell between the second radio station and the radio terminal while the carrier aggregation is being performed.

In a second aspect, a first radio station that serves a first cell includes a communication control unit. The communication control unit supports carrier aggregation of the first cell and a second cell served by a second radio station. The communication control unit performs, with a radio terminal, radio resource control for the first and second cells in order to perform the carrier aggregation in the radio terminal. Further, the communication control unit receives, from at least one of the second radio station and the radio terminal, at least one of: information about a radio link problem occurring in a radio link in the second cell between the second radio station and the radio terminal while the carrier aggregation is being performed; and radio link status information indicating that the problem has been detected in the radio link.

In a third aspect, a second radio station that serves a second cell includes a communication control unit. The communication control unit supports carrier aggregation of a first cell served by a first radio station and the second cell. The communication control unit transmits, to the first radio station, information about a radio link problem occurring in a radio link in the second cell between the second radio station and a radio terminal while the carrier aggregation is being performed by the radio terminal.

In a fourth aspect, a radio terminal includes a communication control unit that supports carrier aggregation using a first cell served by a first radio station as a first cell and using a second cell served by a second radio station as a second cell. The communication control unit performs, with the first radio station, radio resource control for the first and second cells in order to perform the carrier aggregation. Further, the communication control unit transmits, to the first radio station, at least one of: information about a radio link problem occurring in a radio link in the second cell between the second radio station and the radio terminal while the carrier aggregation is being performed; and radio link status information indicating that the problem has been detected in the radio link.

In a fifth aspect, a communication control method, in a first radio station that serves a first cell, includes:
(a) performing, with a radio terminal, radio resource control for the first cell and a second cell served by a second radio station in order to perform carrier aggregation of the first and second cells; and
(b) receiving, from at least one of the second radio station and the radio terminal, at least one of: information about a radio link problem occurring in a radio link in the second cell between the second radio station and the radio terminal while the carrier aggregation is being performed; and radio link status information indicating that the problem has been detected in the radio link.

In a sixth aspect, a communication control method, in a second radio station that serves a second cell, includes:
(a) communicating with a radio terminal in carrier aggregation of a first cell served by a first radio station and the second cell; and
(b) transmitting, to the first radio station, information about a radio link problem occurring in a radio link in the second cell between the second radio station and the radio terminal while the carrier aggregation is being performed.

In a seventh aspect, a communication control method in a radio terminal includes:
(a) performing, with a first radio station, radio resource control for a first cell served by the first radio station and a second cell served by a second radio station in order to perform carrier aggregation of the first and second cells; and
(b) transmitting, to the first radio station, at least one of: information about a radio link problem occurring in a radio link in the second cell between the second radio station and the radio terminal while the carrier aggregation is being performed; and radio link status information indicating that the problem has been detected in the radio link.

In an eighth aspect, a program includes instructions for causing a computer to perform a communication control method according to the above-described fifth aspect.

In a ninth aspect, a program includes instructions for causing a computer to perform a communication control method according to the above-described sixth aspect.

In a tenth aspect, a program includes instructions for causing a computer to perform a communication control method according to the above-described seventh aspect.

Advantageous Effects of Invention

According to the above-described aspects, it is possible to provide a radio communication system, a radio station, a radio terminal, a communication control method, and a program capable of contributing to reduction of packet losses caused by an occurrence of a radio link problem (e.g., an RLF) in a secondary cell during carrier aggregation of a plurality of cells served by different radio stations.

DESCRIPTION OF EMBODIMENTS

Specific embodiments are explained hereinafter in detail with reference to the drawings. The same symbols are assigned to the same or corresponding elements throughout the drawings, and duplicated explanations are omitted as necessary.

First Embodiment

Figure 1:
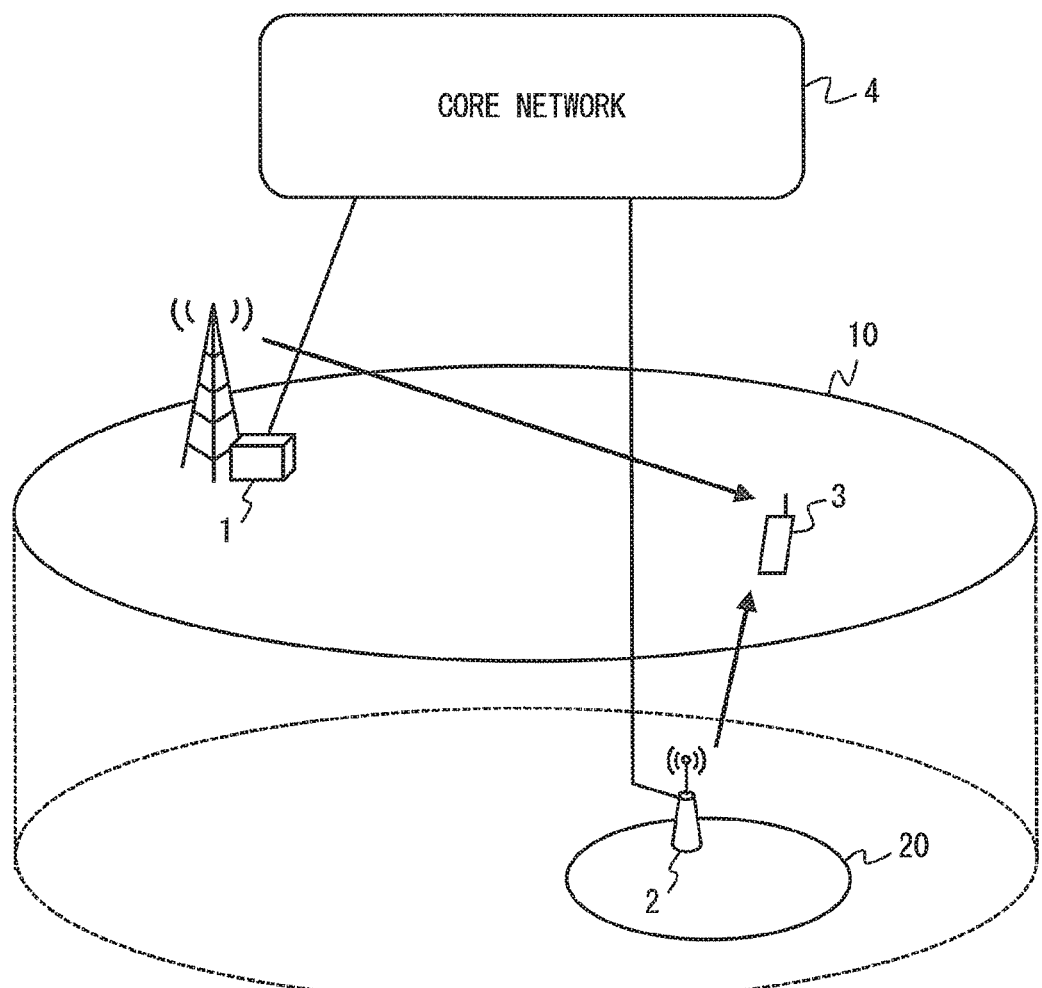
FIG. 1 shows a configuration example of a radio communication system according to a first embodiment.

FIG. 1 shows a configuration example of a radio communication system according to this embodiment. The radio communication system according to this embodiment includes a first radio station 1, a second radio station 2, and a radio terminal 3. The radio stations 1 and 2 are connected to a core network 4 and serve first and second cells 10 and 20, respectively. Each of the radio stations 1 and 2 is, for example, a radio base station, a base station control station, or a simplified radio base station having only some of the functions (protocol layers) of an ordinary radio base station. The radio terminal 3 has a function of, while using a cell of one radio base station, using a cell of another radio station. In other words, the radio terminal 3 supports a carrier aggregation (or cell aggregation) of a plurality of cells served by different radio stations. Note that the different radio stations may be different base stations independent of each other, or may be one radio station and another radio base station dependent on the one radio station. Further, the different radio stations may be radio stations of different types having different functions.

For example, the radio terminal 3 can establish a second radio connection on the second cell 20 while maintaining a first radio connection on the first cell 10. The expression "establishment of a radio connection" corresponds to, for example, a state where the radio terminal 3 can communicate with a radio station (e.g., the radio station 1 or 2), or a state where the radio terminal 3 and a radio station (e.g., the radio station 1 or 2) possess common information necessary for communication therebetween. In this way, the radio terminal 3 can simultaneously use a plurality of cells (e.g., the cells 10 and 20) for transmitting or receiving signals (e.g., user data or control information). The expression "simultaneous use of a plurality of cells" is not limited to actual simultaneous reception or transmission of signals in a plurality of cells. That is, it includes: a state where the radio terminal actually receives or transmits signals in either one of the cells although the radio terminal is able to receive or transmit signals in both of the cells; a state where the radio terminal receives or transmits signals of different types in the respective cells; and a state where the radio terminal uses each of the plurality of cells for either signal reception or signal transmission.

In view of the carrier aggregation of a plurality of cells served by different radio stations, the function of using a plurality of cells served by different radio stations can be called "inter-radio station carrier aggregation". Further, in view of the above-described simultaneous use of a plurality of cells, the function of using a plurality of cells served by different radio stations can also be called "Dual Connection", "Dual Connectivity", "Multi Connection", "Multi Connectivity", or the like.

The radio terminal 3 may transmit to the radio station 1 or the radio station 2 a terminal capability report indicating that the radio terminal 3 is capable of performing inter-radio station carrier aggregation (i.e., supports inter-radio station carrier aggregation). Alternatively, the radio terminal 3 may implicitly indicate that the radio terminal 3 supports inter-radio station carrier aggregation by the category of the radio terminal 3 or its device release number. The capability of performing inter-radio station carrier aggregation can also be called "dual-connection capability" or "multi-connection capability".

FIG. 1 shows a Heterogeneous Network (HetNet) environment. Specifically, the first cell 10 shown in FIG. 1 has coverage wider than that of the second cell 20. Further, FIG. 1 shows a hierarchical cell structure in which the second cell 20 is disposed inside the first cell 10. Note that the cell structure shown in FIG. 1 is merely an example. For example, the first and second cells 10 and 20 may have the same degree of coverage. In other words, the radio communication system according to this embodiment may be applied to a Homogeneous Network environment.

Next, an operation of the radio communication system according to this embodiment is explained in a more detailed manner. In a radio communication system according to this embodiment, the first radio station 1 has control and management functions (e.g., an RRC layer) for the first and second cells 10 and 20 for performing inter-radio station carrier aggregation of the first and second cells 10 and 20. Specifically, the first radio station 1 performs, with the radio terminal 3, radio resource control for the cells 10 and 20 in order to perform carrier aggregation of the cells 10 and 20. The first radio station 1 may transmit a configuration related to the radio resource control to the radio terminal 3 in the first cell 10, or may transmit the configuration to the radio terminal 3 in the second cell 20 through the second radio station 2. In the latter case, although the first radio station 1 transmits to the second radio station 2 a message containing the configuration related to the radio resource control for the second cell 20, the second radio station 2 does not necessarily have to recognize the contents of that message. Alternatively, the second radio station 2 may recognize the contents of the message. When the second radio station 2 transmits the configuration related to the radio resource control in the second cell 20, the second radio station 2 may transmit the configuration in a manner similar to that for transmitting other downlink data.

At least one of the second radio station 2 and the radio terminal 3 transmits, to the first radio station 1, information about a radio link problem occurring in a radio link between the second radio station 2 and the radio terminal 3 in the second cell 20 (Radio link (RL) problem related information). In an example, the radio link problem in the second cell 20 triggers the first radio station 1 to perform control to cope with this radio link problem. The control performed by the first radio station 1 includes, for example, at least one of control to recover the radio link of the radio terminal 3 in the second cell 20, control to release the radio link of the radio terminal 3 in the second cell 20, and control to establish a radio link of the radio terminal 3 in a cell different from the second cell 20 (e.g., the first cell 10 or a third cell). For example, based on the information about the radio link problem in the second cell 20, the first radio station 1 may transmit, to either or both of the second radio station 2 and the radio terminal 3, an instruction for recovering the radio link in the second cell 20, an instruction for establishing a radio link in a different cell (e.g., the first cell 10 or a third cell) instead of the second cell 20, an instruction for releasing the radio link in the second cell 20, or the like.

The radio link problem in the second cell 20 includes, for example, at least one of radio link disconnection or call disconnection (both are called "Radio Link Failure (RLF)") and a loss of synchronization. The radio link problem in the second cell 20 is not limited to serious problems in which the radio terminal 3 cannot perform communication in the second cell 20. The radio link problem may be degradation of received quality or throughput of the radio link, or may be an occurrence of a threshold crossing alert indicating that the received quality of the radio link is lower than a predetermined quality or the throughput is lower than a predetermined value. The radio link received quality may be, for example, reception power or a Signal to Interference plus Noise Ratio (SINR).

When the second radio station 2 or the radio terminal 3 detects a radio link problem in the second cell 20, it may transmit the information about the radio link problem (RL problem related information) to the first radio station 1. Further, when a problem such as the above-described radio link problem is likely to occur or when a problem had occurred but has been recovered, the second radio station 2 or the radio terminal 3 may transmit information about the radio link problem to the first radio station 1. In other words, the information about a radio link problem in the second cell 20 may indicate that a radio link problem is likely to occur or that a radio link problem had occurred but has been recovered. Whether a radio link problem is likely to occur or not may be determined, for example, based on whether or not moving speed of the radio terminal 3 or a parameter related to the moving speed is equal to or exceeds a predetermined value (e.g., based on whether or not the radio terminal 3 is moving at high speed).

The radio terminal 3 may voluntarily transmit information about a radio link problem occurring in the second cell 20, or may transmit it in response to a request from the first radio station 1. For example, upon detecting a radio link problem in the second cell 20, the radio terminal 3 may voluntarily report the information about the radio link problem to the first radio station 1 through the first cell 10. Alternatively, the first radio station 1 may request information about a radio link problem in the second cell 20 from the radio terminal 3, and the radio terminal 3 may transmit the information in response to the request.

Similarly, the second radio station 2 may voluntarily transmit information about a radio link problem occurring in the second cell 20, or may transmit it in response to a request from the first radio station 1. In an example, upon detecting a radio link problem in a radio link with the radio terminal 3 in the second cell 20, the second radio station 2 may voluntarily transmit information about the radio link problem to the first radio station 1. In another example, firstly, the radio terminal 3 may detect a radio link problem in the second cell 20. Next, the radio terminal 3 may report the radio link problem, which has occurred in the second cell 20, to the first radio station 1 through the first cell 10. Then, the first radio station 1 may request the second radio station 2 to transmit information about the radio link problem. Lastly, the second radio station 2 may transmit to the first radio station 1 the information about the radio link problem between the second radio station 2 and the radio terminal 3 in the second cell 20. Further, in still another example, firstly, the first radio station 1 may detect (or somehow recognize) a radio link problem between the radio terminal 3 and the second radio station 2 in the second cell 20. Next, the first radio station 1 may request the second radio station 2 to transmit information about the radio link problem and then the second radio station 2 may transmit the information to the first radio station 1.

The information about a radio link problem (RL problem related information) may include, for example, at least one of the below-listed information elements:
  Trigger information;
  A terminal identifier;
  A cell identifier;
  A bearer identifier;
  A data transmission/reception status;
  Radio quality measurement information;
  Terminal moving speed information; and
  Terminal location information.

A message that is transmitted from the radio terminal 3 to the first radio station 1 through the first cell 10 in order to report a radio link problem detected in the second cell 20 includes the aforementioned information about the radio link problem. Further, this message may include a request or proposal for a release of the second cell 20, or may include a request or proposal for establishment of a radio connection in a third cell different from both the first and second cells 10 and 20.

As described above, in this embodiment, the first radio station 1 performs, with the radio terminal 3, radio link control for the cells 10 and 20 in order to perform inter-radio station carrier aggregation of the cells 10 and 20. Further, at least one of the second radio station 2 and the radio terminal 3 transmits, to the first radio station 1, information about a radio link problem occurring in a radio link in the second cell 20 between the second radio station 2 and the radio terminal 3 (RL problem related information). As a result, the first radio station 1 can recognize the radio link problem occurring in the second cell 20. Accordingly, for example, the first radio station 1 can perform control to cope with the radio link problem in the second cell 20. Thus, this embodiment can reduce packet losses caused by an occurrence of a radio link problem in the second cell 20 during the carrier aggregation of the cells 10 and 20 served by the different radio stations 1 and 2.

Figure 2:
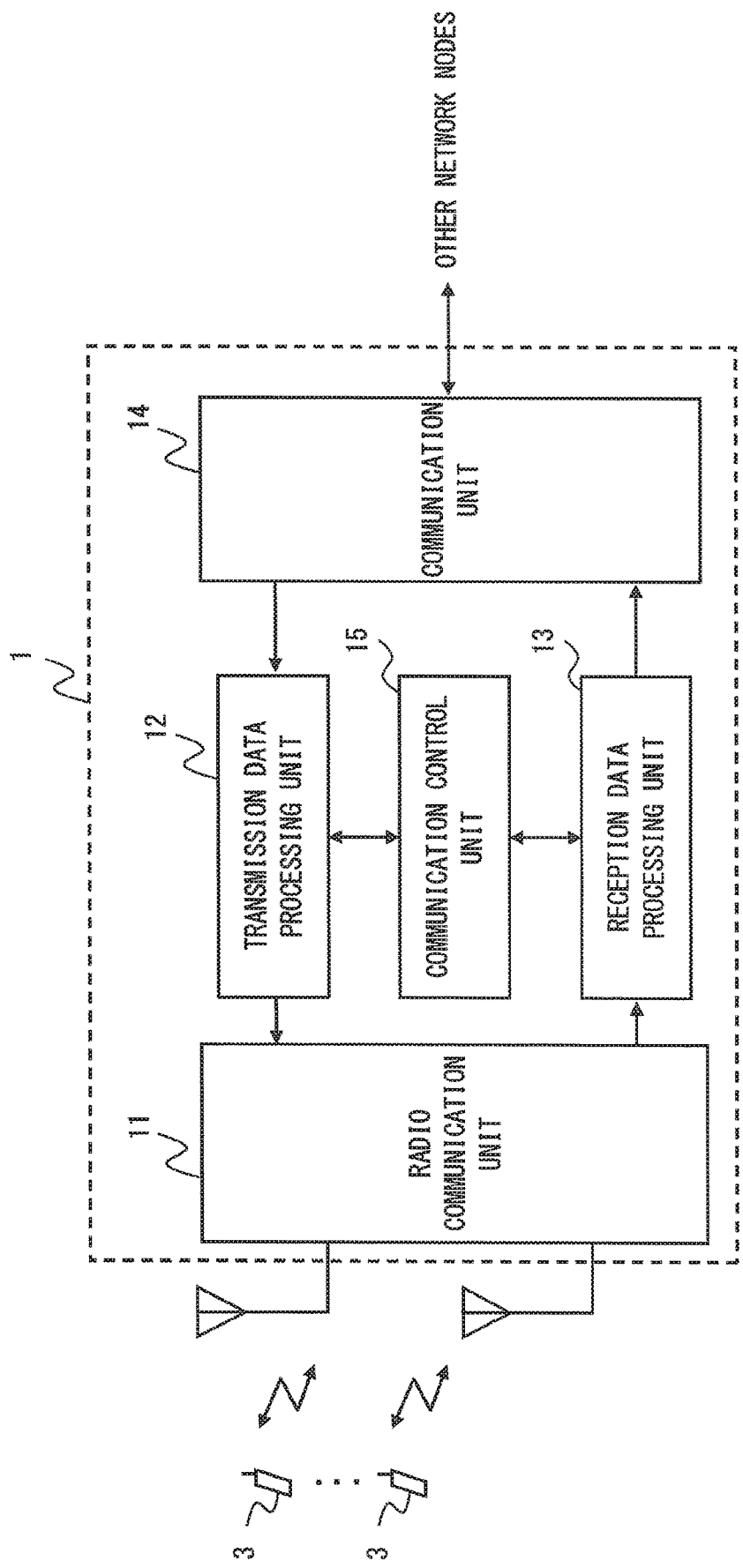
FIG. 2 shows a configuration example of a first radio station according to the first embodiment.

Next, configuration examples of the radio stations 1 and 2 and the radio terminal 3 according to this embodiment are explained. FIG. 2 is a block diagram showing a configuration example of the first radio station 1. A radio communication unit 11 receives an uplink signal transmitted from the radio terminal 3 thorough an antenna. A reception data processing unit 13 restores the received uplink signal. The obtained reception data is forwarded to another network node such as a data transfer device or a mobility management device in the core network 4, or to other radio stations through a communication unit 14. For example, uplink user data received from the radio terminal 3 is forwarded to a data transfer device in a higher-layer network. Further, non-access stratum (NAS) control data among control data received from the radio terminal 3 is forwarded to a mobility management device in a higher-layer network. Further, the reception data processing unit 13 receives, from a communication control unit 15, control data to be transmitted to the radio station 2, and transmits this control data to the radio station 2 through the communication unit 14.

A transmission data processing unit 12 acquires user data destined for the radio terminal 3 from the communication unit 14 and generates a transport channel by performing error correction encoding, rate matching, interleaving, and the like. Further, the transmission data processing unit 12 generates a transmission symbol sequence by adding control information to the data sequence of the transport channel. The radio communication unit 11 generates a downlink signal by performing carrier modulation based on the transmission symbol sequence, frequency conversion, signal amplification, and the like, and transmits the generated downlink signal to the radio terminal 3. Further, the transmission data processing unit 12 receives control data to be transmitted to the radio terminal 3 from the communication control unit 15 and transmits this control data to the radio terminal 3 through the radio communication unit 11.

The communication control unit 15 controls inter-radio station carrier aggregation of the first and second cells 10 and 20. Specifically, the communication control unit 15 performs, with the radio terminal 3 in the first cell 10, radio resource control for the cells 10 and 20 in order to perform carrier aggregation of the cells 10 and 20. Further, the communication control unit 15 receives, from at least one of the second radio station 2 and the radio terminal 3, information about a radio link problem between the second radio station 2 and the radio terminal 3 in the second cell 20. Based on the received information about the radio link problem, the communication control unit 15 may perform control to cope with this problem such as control to recover the radio link of the radio terminal 3 in the second cell 20, control to release the radio link of the radio terminal 3 in the second cell 20, or control to establish a radio link of the radio terminal 3 in a cell different from the second cell 20.

Figure 3:
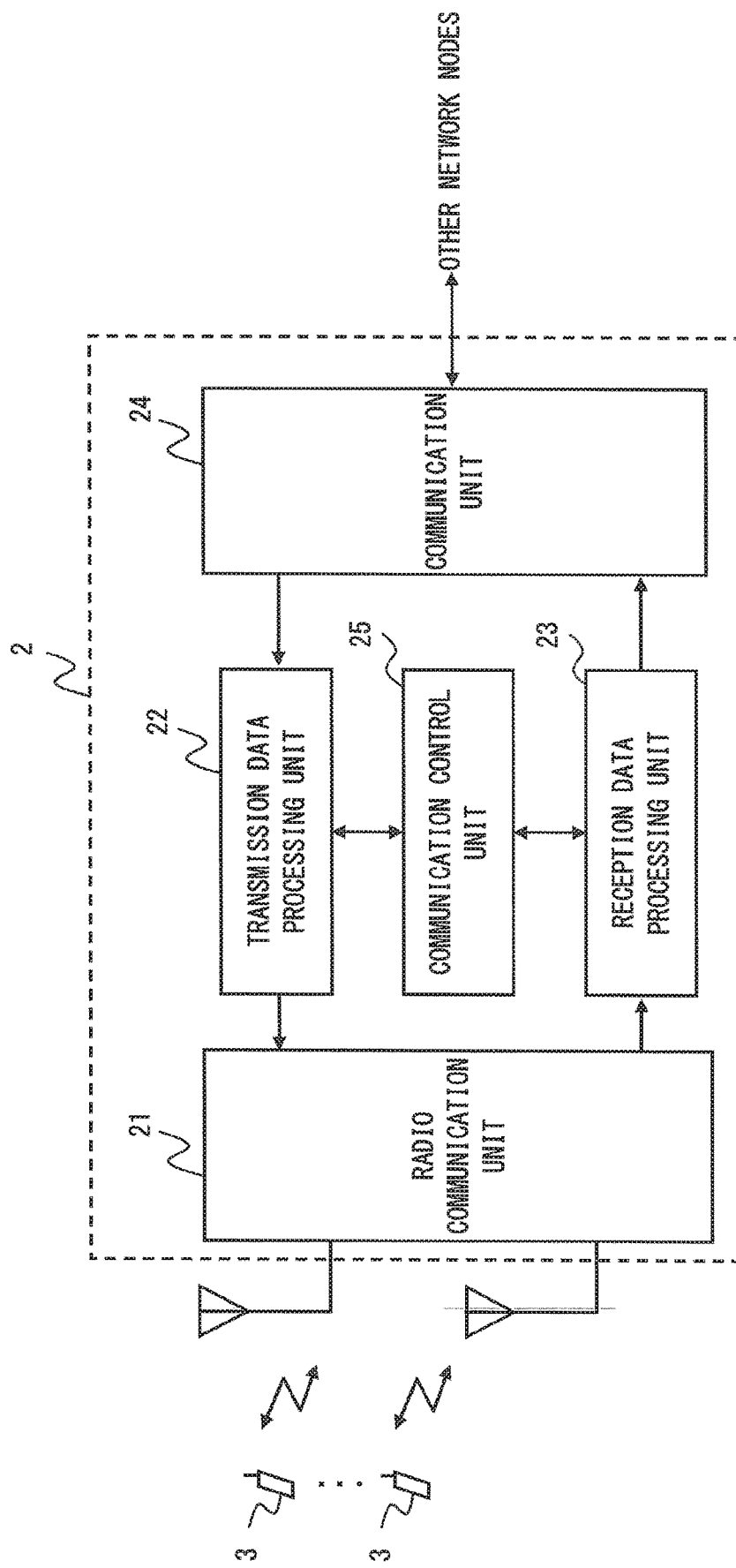
FIG. 3 shows a configuration example of a second radio station according to the first embodiment.

FIG. 3 is a block diagram showing a configuration example of the second radio station 2. The functions and the operations of a radio communication unit 21, a transmission data processing unit 22, a reception data processing unit 23, and a communication unit 24 shown in FIG. 3 are similar to those of their corresponding elements shown in FIG. 2, i.e., those of the radio communication unit 11, the transmission data processing unit 12, the reception data processing unit 13, and the communication unit 14.

A communication control unit 25, in the radio station 2, controls inter-radio station carrier aggregation of the first and second cells 10 and 20. Further, the communication control unit 25 may transmit, to the first radio station 1, information about a radio link problem between the second radio station 2 and the radio terminal 3 in the second cell 20.

Figure 4:
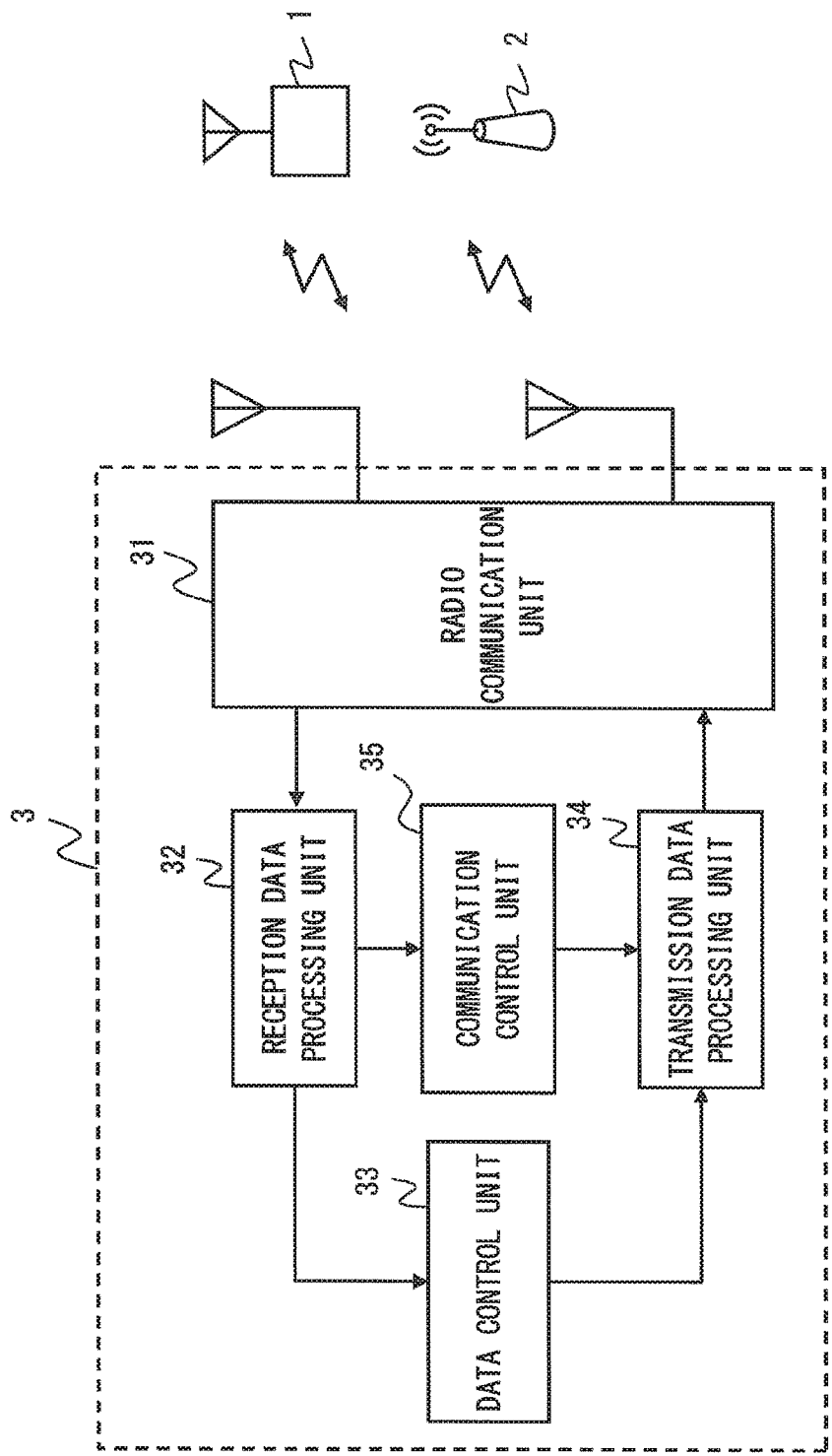
FIG. 4 shows a configuration example of a radio terminal according to the first embodiment.

FIG. 4 is a block diagram showing a configuration example of the radio terminal 3. A radio communication unit 31 supports carrier aggregation of a plurality of cells served by different radio stations, and is able to simultaneously use the plurality of cells (e.g., the cells 10 and 20) for transmitting or receiving signals. Specifically, the radio communication unit 31 receives a downlink signal from one or both of the radio stations 1 and 2 through an antenna. A reception data processing unit 32 restores reception data from the received downlink signal and sends the restored reception data to a data control unit 33. The data control unit 33 uses the reception data according to its purpose. Further, a transmission data processing unit 34 and a radio communication unit 31 generate an uplink signal by using transmission data supplied from the data control unit 33 and transmit the generated uplink signal to one or both of the radio stations 1 and 2.

A communication control unit 35, in the radio terminal 3, controls inter-radio station carrier aggregation of the first and second cells 10 and 20. Further, the communication control unit 35 may transmit, to the first radio station 1, information about a radio link problem between the second radio station 2 and the radio terminal 3 in the second cell 20.

Next, Procedure Examples 1 and 2 of a communication control method in a radio communication system according to this embodiment are explained hereinafter.

Procedure Example 1

Figure 5:
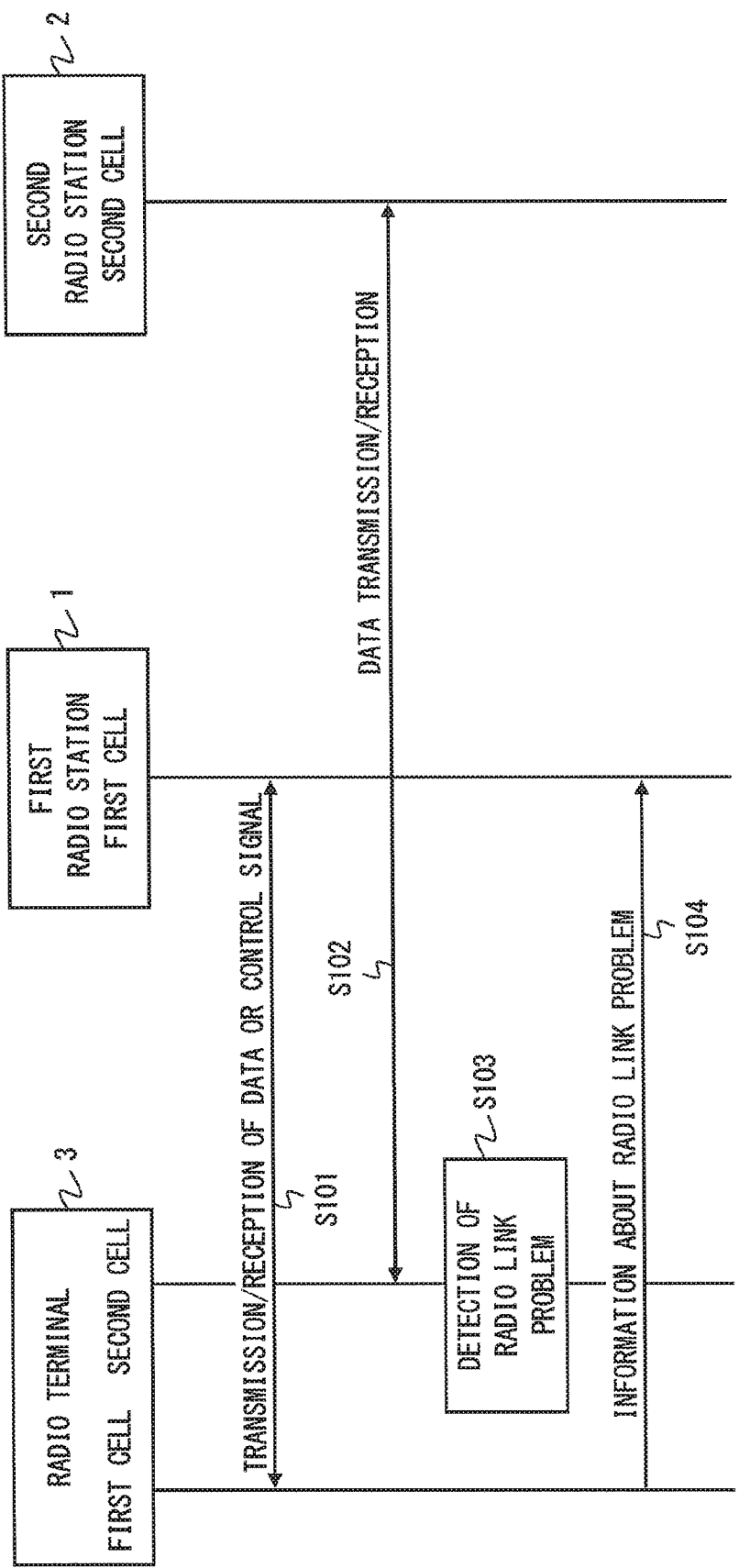
FIG. 5 is a sequence diagram showing an example of a communication control method in a radio communication system according to the first embodiment (Procedure Example 1)

In Procedure Example 1, the radio terminal 3 transmits information about a radio link problem occurring in the second cell 20 to the first radio station 1. FIG. 5 shows an example of a sequence diagram showing a communication control method according to the Procedure Example 1. In steps S101 and S102, the radio terminal 3 performs carrier aggregation of the first and second cells 10 and 20. That is, in the steps S101 and S102, the first radio station 1 transmits and/or receives data or control information to and/or from the radio terminal 3 in the first cell 10 and the second radio station 2 transmits and/or receives data to and/or from the radio terminal 3 in the second cell 20.

In a step S103, the radio terminal 3 detects a radio link problem occurring in a radio link between the second radio station 2 and the radio terminal 3 in the second cell 20. Note that as described previously, the radio terminal 3 may detect that a problem is likely to occur in the radio link in the second cell 20, or detect that a radio link problem had occurred but has been recovered. In a step S104, the radio terminal 3 transmits, to the first radio station 1 through the first cell 10, information about the radio link problem in the second cell 20.

According to the procedure shown in FIG. 5, the first radio station 1 can recognize the radio link problem occurring in the second cell 20 and can reduce (or prevent) packet losses and the like by appropriately coping with the problem. Though it is not clearly shown in FIG. 5, for example, the first radio station 1 may transmit, to either or both of the second radio station 2 and the radio terminal 3, an instruction for recovering the radio link in the second cell 20, an instruction for establishing a radio link in a different cell (e.g., the first cell 10 or a third cell) instead of the second cell 20, or an instruction for releasing the radio link in the second cell 20.

(Modification of Procedure Example 1)

The procedure shown in FIG. 5 is merely an example of a case where information about a radio link problem in the second cell 20 is transmitted from the radio terminal 3 to the first radio station 1. The Procedure Example 1 may be modified as follows.

Firstly, the first radio station 1 requests the radio terminal 3 to report information about a radio link problem occurring in the second cell 20. Then, the radio terminal 3 transmits the information about the radio link problem occurring in the second cell 20, in response to the request from the first radio station 1. The information about a radio link problem is not limited to information about a problem in the second cell 20, but may include information about a radio link problem in the first cell 10 or other cells used by the radio terminal 3. When no radio link problem occurs in the second cell 20 or no problem is detected, the radio terminal 3 may transmit information indicating that there is no problem (or no problem is detected), in response to the request from the first radio station 1.

The first radio station 1 may transmit to the radio terminal 3 a condition(s) for determining whether or not there is a radio link problem. The radio terminal 3 may determine whether or not there is a radio link problem based on this condition(s).

Procedure Example 2

Figure 6:
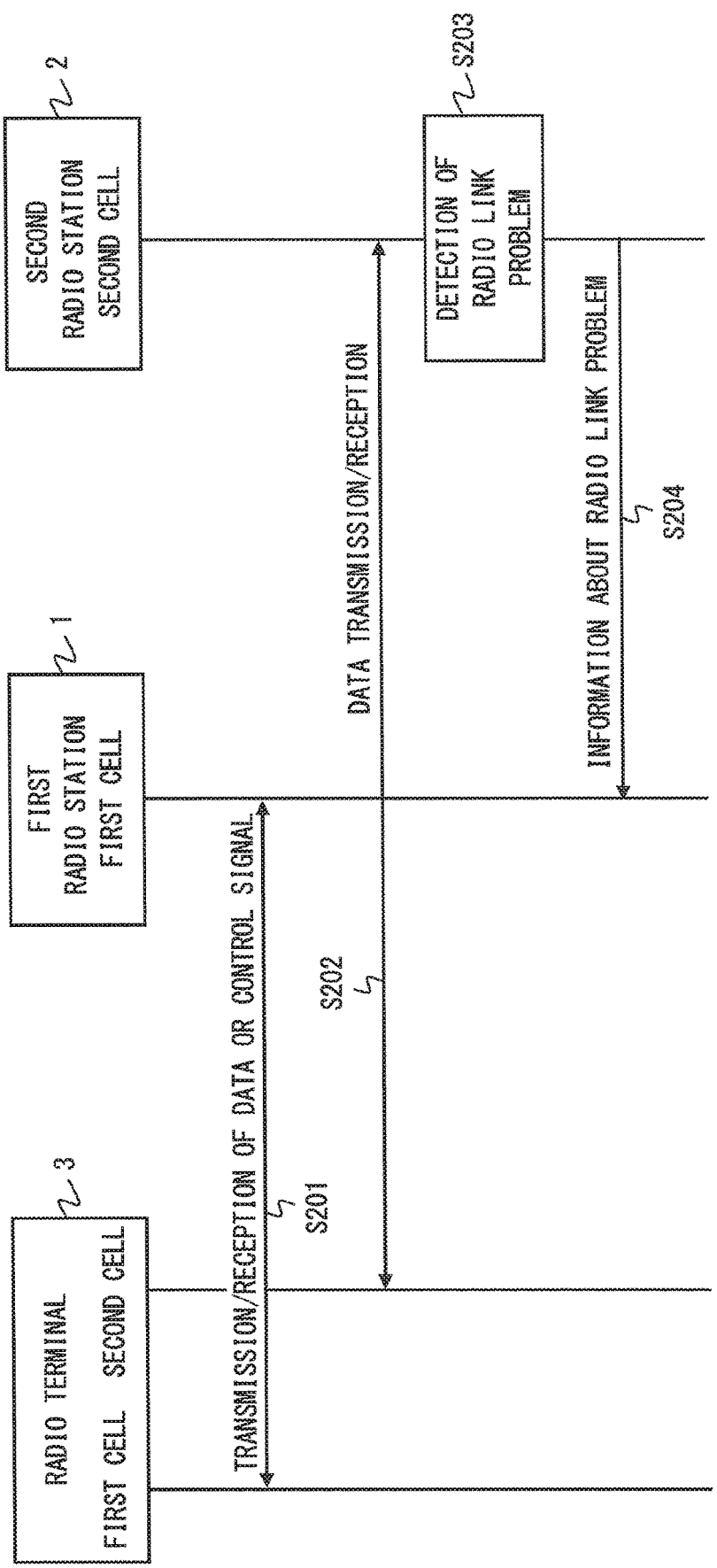
FIG. 6 is a sequence diagram showing an example of a communication control method in a radio communication system according to the first embodiment (Procedure Example 2)

In Procedure Example 1, the second radio station 2 transmits information about a radio link problem occurring in the second cell 20 to the first radio station 1. FIG. 6 shows an example of a sequence diagram showing a communication control method according to the Procedure Example 2. Processes in steps S201 and S202 are similar to those in the steps S101 and S102 in FIG. 5, which are explained above in the Procedure Example 1. In a step S203, the second radio station 2 detects a radio link problem occurring in a radio link in the second cell 20 between the second radio station 2 and the radio terminal 3. The second radio station 2 may detect that a problem is likely to occur in the radio link between the second radio station 2 and the radio terminal 3, or detect that a radio link problem had occurred but has been recovered. In a step S204, the second radio station 2 transmits information about the radio link problem in the second cell 20 to the first radio station 1.

According to the procedure shown in FIG. 6, the first radio station 1 can recognize the radio link problem occurring in the second cell 20 and can reduce (or prevent) packet losses and the like by appropriately coping with the problem. Though it is not clearly shown in FIG. 6, for example, the first radio station 1 may transmit, to either or both of the second radio station 2 and the radio terminal 3, an instruction for recovering the radio link in the second cell 20, an instruction for establishing a radio link in a different cell (e.g., the first cell 10 or a third cell) as a substitute for the second cell 20, or an instruction for releasing the radio link in the second cell 20.

(Modification 1 of Procedure Example 2)

The procedure shown in FIG. 6 is merely an example of a case where information about a radio link problem in the second cell 20 is transmitted from the second radio station 2 to the first radio station 1. The Procedure Example 2 may be modified as follows. Firstly, the first radio station 1 requests the second radio station 2 to report information about a radio link problem occurring in the second cell 20. Then, the second radio station 2 transmits the information about a radio link problem occurring in the second cell 20, in response to the request front the first radio station 1. The information about a radio link problem is not limited to information about a problem in the second cell 20, but may include information about a problem in another cell that is served by the second radio station 2 and used by the radio terminal 3. When no radio link problem occurs in the second cell 20 or no problem is detected, the second radio station 2 may transmit information indicating that there is no problem (or no problem is detected), in response to the request front the first radio station 1.

The first radio station 1 may transmit to the second radio station 2 a condition(s) for determining whether or not there is a radio link problem. The second radio station 2 may determine whether or not there is a radio link problem based on this condition(s).

(Modification 2 of Procedure Example 2)

The Procedure Example 2 may be modified as follows. Firstly, the radio terminal 3 detects a radio link problem in the second cell 20 and reports, to the first radio station 1, radio link status information indicating that the radio terminal 3 has detected the radio link problem. Next, the first radio station 1 requests the second radio station 2 to transmit information about the radio link problem in the second cell 20 regarding the radio terminal 3, from which the radio link status information has been originated. Then, the second radio station 2 transmits the information about the radio link problem to the first radio station 1 in response to the request from the first radio station 1. The radio link status information transmitted from the radio terminal 3 to the first radio station 1 may include, for example, a cell identifier (Cell ID) of the cell where the problem has been detected and the type of the problem (i.e., information indicating what kind of problem has occurred).

Second Embodiment

In this embodiment, an example where the above-described first embodiment is applied to a 3GPP LTE system is explained. A configuration example of a radio communication system according to this embodiment may be similar to that shown in FIG. 1. Note that the radio stations 1 and 2 correspond to eNBs, the radio terminal 3 corresponds to an UE, and the core network 4 corresponds to an EPC (Evolved Packet Core). Transmission and reception of information between radio stations (i.e., between eNBs) may use an X2 interface, which is a direct interface, may use an S1 interface through the EPC, or may use a newly-defined interface (e.g., an X3 interface). The following explanation is given on the assumption that: the radio stations 1 and 2 are eNBs 1 and 2; the radio terminal 3 is an UE 3; and the core network 4 is an EPC 4.

The radio terminal (UE) 3 can establish a second radio connection in the second cell 20 (Cell 20) while maintaining a first radio connection in the first cell 10 (Cell 10). The expression "establishment of a radio connection" corresponds to, for example, a state where the UE 3 can communicate with an eNB (e.g., the eNB 1 or 2) (e.g., a state where RRC Connection Setup has already been completed), or a state where the UE 3 and an eNB (e.g., the eNB 1 or 2) possess common information (e.g., UE context) necessary for communication therebetween. More specifically, the UE 3 supports carrier aggregation of a plurality of cells served by different radio stations (eNBs) (called "Inter-eNB CA" or "Inter-Site CA"). Note that the term "Inter-eNB CA" in this specification is not limited to actual simultaneous reception or transmission of signals in different eNB cells. For example the "Inter-eNB CA" includes: a state where the radio terminal (UE) actually receives or transmits signals (e.g., user data or control information) in either one of the eNB cells although the UE 3 is able to receive or transmit signals in both of the different eNB cells; a state where the radio terminal receives or transmits signals of different types in the respective cells of different eNBs; and a state where the radio terminal uses each of the cells of different eNBs for either signal reception or signal transmission.

As an example to which this embodiment is applied, it is conceivable that the UE 3 performs inter-radio base station carrier aggregation (Inter-eNB CA) in which the UE 3 uses the Cell 20 of the eNB 2 as a secondary cell (SCell) while the UE 3 is already using the Cell 10 of the eNB 1 as a primary cell (PCell). The primary cell (PCell) is a cell that has already been used since before the CA is started. In contrast to this, the second cell (SCell) is a cell that is used (activated) in addition to the PCell or in dependence thereon on the precondition that the UE 3 is already connected to the primary cell. Non-Access Stratum (NAS) mobility information, security information (or security input), and the like are transmitted and received through the PCell when a radio connection is established (i.e., at the time of RRC Connection Establishment) or reestablished (i.e., at the time of RRC Connection Re-establishment). A DL Component Carrier used for the PCell is a DL PCC, and an UL Component Carrier used for the PCell is an UL PCC. Similarly, a DL Component Carrier used for the SCell is a DL SCC, and an UL Component Carrier used for the SCell is an UL SCC.

The radio terminal (UE) 3 establishes a radio connection (RRC Connection) with the first radio base station (eNB) 1 in the first cell 10 (Cell 10, e.g., PCell), and establishes a radio connection with the second radio base station (eNB) 2 in the second cell 20 (Cell 20, e.g., SCell). The eNB 1 has control and management functions (e.g., an RRC layer) in the Cell 10 and the Cell 20. Specifically, the eNB 1 preforms, with the UE 3, radio resource control for the Cell 10 and the Cell 20 in order to perform carrier aggregation of the Cell 10 and the Cell 20. The eNB 1 may transmit a configuration related to the radio resource control (e.g., Radio Resource Configuration) to the UE 3 in the Cell 10, or may transmit the configuration to the UE 3 through the Cell 20 via the eNB 2. In the latter case, although the eNB 1 transmits a message including the configuration, which is related to the radio resource control for the Cell 20, to the eNB 2 through an X2 interface or an S1 interface (or a new interface), the eNB 2 does not necessarily have to recognize the contents of that message. Alternatively, the eNB 2 may recognize the contents of the message. When the eNB 2 transmits the configuration related to the radio resource control in the Cell 20, the eNB 2 may transmit the configuration on a Data Radio Bearer (DRB) in a manner similar to that for transmitting other data.

At least one of the eNB 2 and the UE 3 transmits, to the eNB 1, information about a radio link problem occurring in a radio link between the eNB 2 and the UE 3 in the Cell 20 (RL problem related information). In an example, the radio link problem in the Cell 20 triggers the eNB 1 to perform control to cope with this radio link problem. The control performed by the eNB 1 includes, for example, at least one of control to recover the radio link of the UE 3 in the Cell 20 (Radio Link Recovery), control to release the radio link of the UE 3 in the Cell 20 (Radio Link Release, RRC Connection Release), and control to establish a radio link of the UE 3 in a cell different from the Cell 20 (e.g., the Cell 10 or a third cell) (RRC Connection Setup). For example, based on the information about the radio link problem in the Cell 20, the eNB 1 may transmit, to either or both of the eNB 2 and the UE 3, an instruction for recovering the radio link in the Cell 20, an instruction for establishing a radio link in a different cell (e.g., the Cell 10 or a third cell) instead of the Cell 20, an instruction for releasing the radio link in the Cell 20, or the like.

The radio link problem in the Cell 20 includes, for example, at least one of radio link disconnection or call disconnection (both are called "Radio Link Failure (RLF)") and a loss of synchronization. The radio link problem in the Cell 20 is not limited to serious problems in which the UE 3 cannot perform communication in the Cell 20. The radio link problem may be degradation of received quality or throughput of the radio link, or may be an occurrence of a threshold crossing alert indicating that the received quality of the radio link is lower than a predetermined quality or the throughput is lower than a predetermined value. The radio link received quality may be, for example, Reference Signal Received Power (RSRP), Reference Signal Received Quality (RSRQ), or Received Signal Strength Indicator (RSSI).

When the eNB 2 or the UE 3 detects a radio link problem in the Cell 20, it may transmit information about the radio link problem (RL problem related information) to the eNB 1. Further, when a problem such as the above-described radio link problem is likely to occur or when a radio link problem had occurred but has been recovered, the eNB 2 or the UE 3 may transmit information about the radio link problem to the eNB 1. In other words, the information about a radio link problem in the Cell 20 may indicate that a radio link problem is likely to occur or that a radio link problem had occurred but has been recovered. Whether a radio link problem is likely to occur or not may be determined, for example, based on whether or not moving speed of the UE 3 or a parameter rerated to the moving speed (e.g., Mobility State) is equal to or exceeds a predetermined value (e.g., based on whether or not the mobile terminal is moving at high speed).

The UE 3 may voluntarily transmit information about a radio link problem occurring in the Cell 20, or may transmit it in response to a request from the eNB 1. For example, upon detecting a radio link problem in the Cell 20, the UE 3 may voluntarily report the information about the radio link problem to the eNB 1 through the Cell 10. Alternatively, the eNB 1 may request information about a radio link problem in the Cell 20 from the UE 3, and the UE 3 may transmit the information in response to the request.

Similarly, the eNB 2 may voluntarily transmit information about a radio link problem occurring in the Cell 20, or may transmit it in response to a request from the eNB 1. In an example, upon detecting a radio link problem in a radio link with the UE 3 in the Cell 20, the eNB 2 may voluntarily transmit information about the radio link problem to the eNB 1. In another example, firstly, the UE 3 may detect a radio link problem in the Cell 20. Next, the UE 3 may report the radio link problem, which has occurred in the Cell 20, to the eNB 1 through the Cell 10. Then, the eNB 1 may request the eNB 2 to transmit information about the radio link problem. Lastly, the eNB 2 may transmit, to the eNB 1, the information about the radio link problem in the radio link with the UE 3 in the Cell 20. Further, in still another example, firstly, the eNB 1 may detect (or somehow recognize) a radio link problem in a radio link between the UE 3 and the eNB 2 in the Cell 20. Next, the eNB 1 may request the eNB 2 to transmit information about the radio link problem and then the eNB 2 may transmit the information to the eNB 1.

The information about a radio link problem (RL problem related information) may include, for example, at least one of the below-listed information elements:
Trigger information (Trigger information);
A terminal identifier (UE identity);
A cell identifier (Cell identity);
A bearer identifier (bearer identity);
A data transmission/reception status (data status);
Radio quality measurement information (measurement information);
Terminal moving speed information (UE speed information); and
Terminal location information (UE location information).

The trigger information may be a cause of the transmission of information about a radio link problem, or, for example, information indicating that an RL problem has been detected in the SCell (SCell RL problem) or indicating which type of the above-described radio link problems has occurred. Alternatively, the trigger information may be information indicating purpose (or intention) of transmitting information about a radio link problem, or, for example, information indicating what is expected by transmitting the information. For example, the trigger information may indicate a recovery of the radio link, a release of the radio link, establishment of a new radio link, or the like.

The terminal identifier may be a temporary terminal identifier in the cell to which the information about the radio link problem is related, or a terminal unique identifier. The temporary terminal identifier is, for example, a Cell Radio Network Temporary Identifier (C-RNTI), a Temporary Mobile Subscriber Identity (TMSI), or a Short Message Authentication Code Identity (Short MAC-I). The terminal unique identifier is, for example, an International Mobile Subscriber Identity (IMSI).

The cell identifier is, for example, a physical cell identifier (Physical Cell Identifier (PCI)), a logical cell identifier (E-UTRAN Cell Global Identifier (ECGI)), an enhanced cell identifier (Enhanced Cell ID (E-CID)), or a virtual cell identifier (Virtual Cell ID (V-CID)).

The bearer identifier may be an identifier of a radio bearer in the cell to which the information about the radio link problem is related, or an identifier of a network bearer. The radio bearer identifier is, for example, a Data Radio Bearer Identity (DRB-Identity). The network bearer identifier is, for example, an eps-BearerIdentity or an EPS Radio Access Bearer Identity (E-RAB ID).

The data transmission/reception status may be a status related to data transmission or data reception in the cell to which the information about the radio link problem is related (e.g., a Sequence Number (SN) Status or a Radio Link Control (RLC) Status), or may be information indicating whether or not there is data of which transmission or reception has not yet been completed (e.g., a data flag).

The radio quality measurement information may be terminal measurement results of the cell to which the information about the radio link problem is related, or a cell(s) adjacent thereto. The radio quality measurement information may be information indicating whether or not a predetermined radio quality is satisfied.

The terminal moving speed information may indicate the moving speed of the radio terminal (UE speed). Alternatively, the terminal moving speed information may be information indicating a level of the moving speed of the radio terminal (e.g., High speed, Medium speed, Low speed, or Normal speed; or the Mobility State is High, Medium, or Normal), or may be information indicating whether or not the moving speed of the radio terminal satisfies a predetermined condition (e.g., information indicating whether or not the radio terminal is a high-speed mobile terminal).

The terminal location information may be location information of the radio terminal (e.g., Global Positioning System (GPS) location information or positioning information), or may be information indicating a rough location of the radio terminal (e.g., an RF fingerprint which is a combination of a radio quality and a cell ID). Alternatively, the terminal location information may be information indicating whether the radio terminal is located outdoors or indoors.

A message that is transmitted from the UE 3 to the eNB 1 through the Cell 10 in order to report a radio link problem, which had occurred in the Cell 20, includes aforementioned information about the radio link problem. Further, this message may include a request or proposal for a release of the Cell 20 (SCell release request, or SCell (re)configuration request—release), or may include a request or proposal for establishment of a radio connection in a third cell different from both the Cell 10 and the Cell 20 (SCell (re)configuration request—Cell3 addition).

Next, Procedure Examples 3 to 6 of a communication control method performed in a radio communication system according to this embodiment are explained hereinafter. Note that, it is assumed that the UE 3 performs inter-radio base station carrier aggregation (Inter-eNB CA) in which the UE 3 uses the Cell 20 of the eNB 2 as the SCell while the UE3 is already using the Cell 10 of the eNB 1 as the PCell. The timer that the UE 3 uses to determine an occurrence of an RLF in the Cell 20 (i.e., the SCell) may be the same timer as a timer T310 used for the Cell 10 (i.e., the PCell), or a different timer T3XY (e.g., T312) may be defined. Further, the value of the timer T3XY may be the same as or different from that of the timer T310. The received quality threshold(s) (Qin and Qout) used for determining an occurrence of an RLF may be the same as a threshold(s) for the PCell, or may be different from the threshold(s) for the PCell (e.g., Qin-SCell and Qout-SCell; or Qin2 and Qout2).

Procedure Example 3

Figure 7:
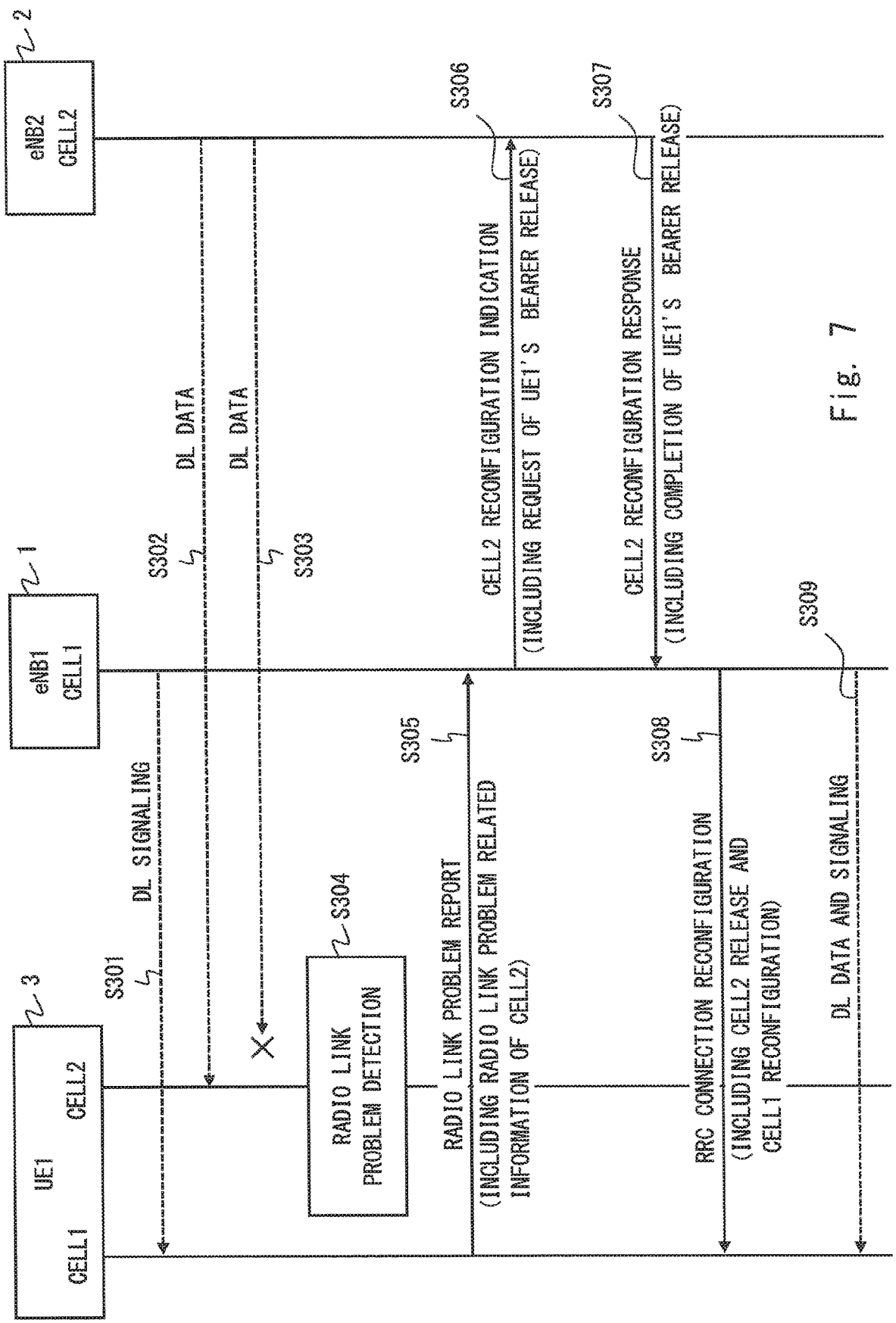
FIG. 7 is a sequence diagram showing an example of a communication control method in a radio communication system according to a second embodiment (Procedure Example 3)

Procedure Example 3 corresponds to the Procedure Example 1 explained in the first embodiment. That is, the UE 3 transmits information about a radio link problem occurring in the Cell 20 (i.e., the SCell) to the eNB 1. FIG. 7 shows an example of a sequence diagram showing the Procedure Example 3. Note that in FIG. 7, the Cell 10 (i.e., the PCell) and the Cell 20 (i.e., the SCell) are expressed as "CELL1" and "CELL2", respectively. Further, one UE 3 is expressed as "UE 1".

In steps S301 and S202, the UE 3 performs carrier aggregation of the CELL1 and the CELL2. Specifically, in the step S301, the eNB 1 transmits downlink control signals (DL signaling) or downlink data (DL data), or both of them to the UE 1 in the CELL1. In the step S302, the eNB 2 transmits downlink data (DL data) to the UE 3 in the CELL2.

In steps S303 and S304, the UE 3 detects a radio link problem in the CELL2 (Radio link problem detection). In a step S305, the UE 3 transmits information about the radio link problem to the eNB 1 through the CELL1 (Radio link problem report (including Radio link problem related information of CELL2)).

In steps S306 to S309, the eNB 1 performs a process to cope with this problem upon receiving the information about the radio link problem occurring in the CELL2. That is, in a step S306, the eNB 1 instructs the eNB 2 to release a bearer that has been configured for the UE 3 (UE 1 in FIG. 7), which has detected the radio link problem in the CELL2 (CELL2 reconfiguration indication (including request of UE1's bearer release)). In a step S307, the eNB 2 releases the bearer for the UE 3 and reports the completion of the bearer release to the eNB 1 (CELL2 reconfiguration response (including completion of UE 1's bearer release)). In a step S308, the eNB 1 instructs the UE 3 to release the CELL2 (i.e., the bearer of the CELL2) and to reconfigure the radio resource configuration of the CELL1 (RRC Connection Reconfiguration (including CELL2 release and CELL1 reconfiguration)).

In the example shown in FIG. 7, the UE 3 continues (i.e., takes over) the DL data reception performed in the CELL2 by performing it in the CELL1. In this case, the instruction to reconfigure the radio resource configuration of the CELL1 includes information necessary to indicate, for example, that the bearer configured in the CELL2 used in the CELL2) should be reconfigured as a bearer in the CELL1, or that the data communication performed in the CELL2 (DL data reception in FIG. 7) should be taken over by performing it in the CELL1. As a result, in a step S309, the eNB 1 transmits to the UE 3 the DL signaling and the DL data in the CELL1.

According to the procedure shown in FIG. 7, the eNB 1 can recognize the radio link problem occurring in the Cell 20 and can reduce (or prevent) packet losses and the like by appropriately coping with the problem.

(Modification of Procedure Example 3)

The procedure shown in FIG. 7 is merely an example of a case where information about a radio link problem in the Cell 20 is transmitted from the UE 3 to the eNB 1. The Procedure Example 3 may be modified as follows.

When the eNB 1 instructs the eNB 2 to release the bearer of the UE 3, the eNB 1 may request the data communication status (e.g., an SN status) of the UE 3 in the Cell 20 from the eNB 2 and the eNB 2 may report the data communication status to the eNB 1.

Though it is not shown in FIG. 7, when the eNB 1 takes over the bearer configuration of the Cell 20 configured in the eNB 2 and uses it for the Cell 10, it is also necessary to reconfigure the core network (EPC) 4. For example, the eNB 1 requests a Mobility Management Entity (MME) disposed in the EPC 4 to configure (or reconfigure) the bearer for the UE 3, and then the MME sends a bearer setup instruction to the eNB 1. Further, the MME instructs an S-GW to change the User Plane (Data) path (Path switch request) and the S-GW changes the path (Path switch).

Although FIG. 7 shows a case where a problem in downlink data transmission in the Cell 20 is coped with, a problem in uplink data (UL data) transmission in the Cell 20 may be coped with in a similar manner.

FIG. 7 shows an example where the eNB 1 controls establishment of a radio link for the UE 3 in the Cell 10 in order to cope with a radio link problem in the Cell 20. However, the eNB 1 may transmit, to the UE 3 through the Cell 10, an instruction for recovering the radio link in the Cell 20 or an instruction for establishing a radio link in a cell different from both the Cell 10 and the Cell 20 (e.g., a third cell (CELL3)).

The UE 3 may transmit to the eNB 1 a request to configure (i.e., adding) a cell, instead of the Cell 20, as a secondary cell (SCell), or a request to remove the Cell 20 from the SCell(s).

Procedure Example 4

Figure 8:
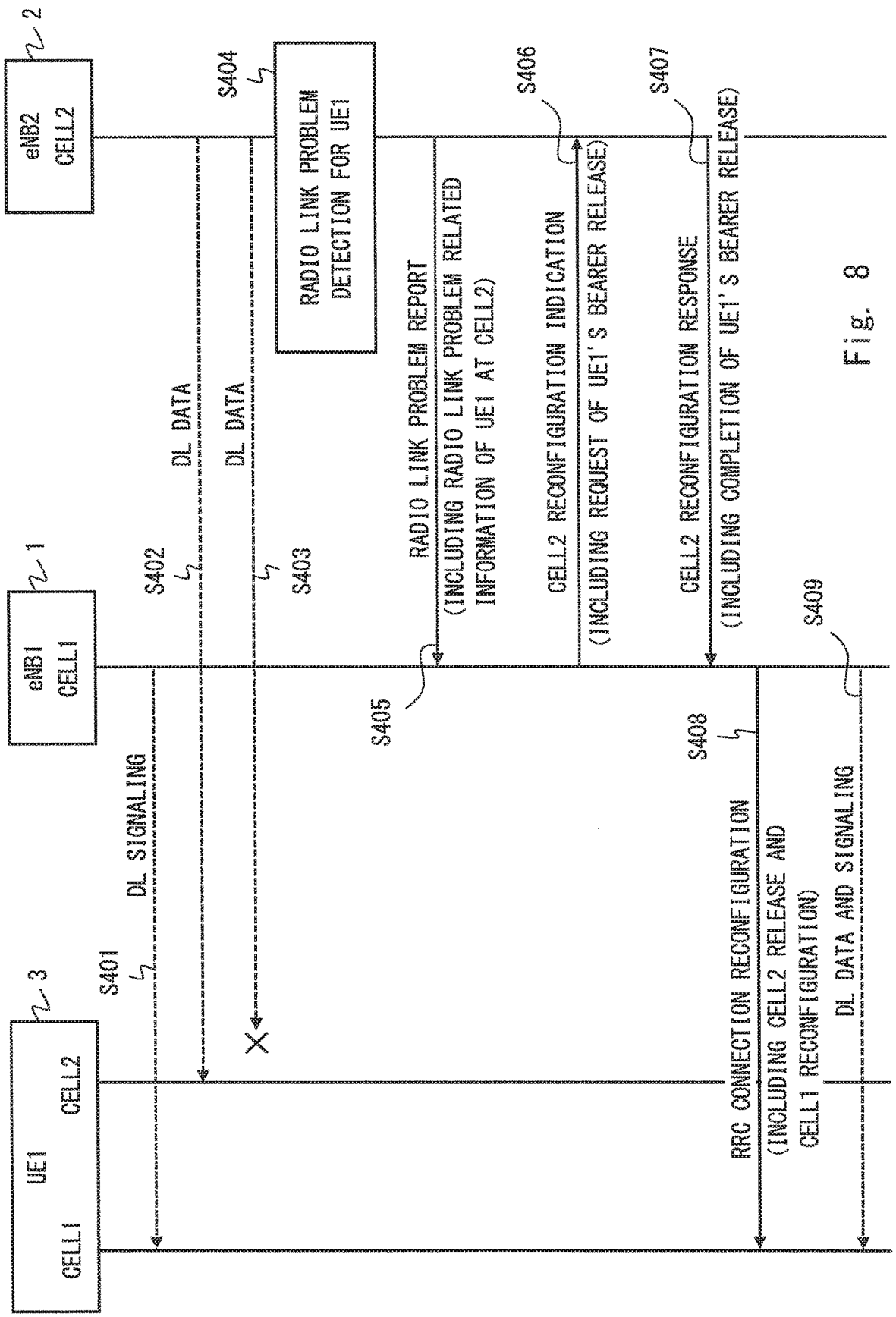
FIG. 8 is a sequence diagram showing an example of a communication control method in a radio communication system according to a second embodiment (Procedure Example 4)

Procedure Example 4 corresponds to the Procedure Example 2 explained in the first embodiment. That is, eNB 2 transmits information about a radio link problem occurring in the Cell 20 to the eNB 1. FIG. 8 shows an example of a sequence diagram showing a communication control method according to the Procedure Example 4. Note that in FIG. 8, the Cell 10 (i.e., the PCell) and the Cell 20 (i.e., the SCell) are expressed as "CELL1" and "CELL2", respectively. Further, one UE 3 is expressed as "UE 1".

Processes in steps S401 and S402 are similar to those in the steps S301 and S302 in FIG. 7, which are explained above in the Procedure Example 3. In steps S403 and S404, the eNB 2 detects that there is a radio link problem between the eNB 2 and the UE 3 (UE 1 in FIG. 8) in the CELL2 (Radio link problem detection for UE1). In a step S405, the eNB 2 transmits information about the radio link problem to the eNB 1 (Radio link problem report (including Radio link problem related information of UE1 at CELL2)).

In steps S406 to S409, the eNB 1 performs a process to cope with the problem upon receiving the information about the radio link problem occurring in the CELL2. Processes in steps S406 to S409 are similar to those in the steps S306 to S309 in FIG. 7.

According to the procedure shown in FIG. 8, the eNB 1 can recognize the radio link problem occurring in the Cell 20 and can reduce (or prevent) packet losses and the like by appropriately coping with the problem.

(Modification of Procedure Example 4)

The procedure shown in FIG. 8 is merely an example of a case where information about a radio link problem in the Cell 20 is transmitted from the eNB 2 to the eNB 1. The Procedure Example 4 may be modified as follows.

When the eNB 2 detects that there is a radio link problem in the radio link between the eNB 2 and the UE 3 in the Cell 20, the eNB 2 may firstly transmit a message for reporting the detection and then transmit follow-up message containing detailed information about the radio link problem. The follow-up message may be transmitted by the eNB 2, for example, as a response message to a request from the eNB 1.

Though it is not shown in FIG. 8, when the eNB 1 takes over the bearer configuration of the Cell 20 configured in the eNB 2 and uses it for the Cell 10, it is also necessary to reconfigure the core network (EPC) 4. The reconfiguration in the core network may be performed in accordance with the procedure shown in the Procedure Example 3.

Although FIG. 8 shows a case where a problem in downlink data transmission in the Cell 20 is coped with, a problem in uplink data (UL data) transmission in the Cell 20 may be coped with in a similar manner.

FIG. 8 shows an example where the eNB 1 controls establishment of a radio link for the UE 3 in the Cell 10 in order to cope with a radio link problem in the Cell 20. However, the eNB 1 may transmit, to the UE 3 through the Cell 10, an instruction for recovering the radio link in the Cell 20 or an instruction for establishing a radio link in a cell different from both the Cell 10 and the Cell 20 (e.g., a third cell (CELL3)).

Procedure Example 5

Procedure Example 5 corresponds to a modification of Procedure Example 2 explained in the first embodiment. In the Procedure Example 5, the UE 3 reports the detection of a radio link problem occurring in the Cell 20 to the eNB 1 as radio link status information, the eNB 1 requests information about the radio link problem from the eNB 2, and then the eNB 2 transmits the information about the radio link problem in response to the request.

The radio link status information may include, for example, a Radio Link Failure (RLF) report. Note that although the REF report in the LTE is information about an RLF in the PCell, it is assumed here that the RLF report is extended to information about an RLF in the SCell. That is, the REF report may include any of the below-listed items:

An identifier of an SCell where an RLF has been detected (failedSCellId);

A terminal measurement result of an SCell where an RLF has been detected (measurementResultLastServSCell);

A terminal measurement result at the time of detection of an RLF in an SCell (measResultNeighCells);

Location information of a radio terminal at the time of detection of an RLF in an SCell (locationInfo);

A cause of detection of an RLF in an SCell (rlf-Cause-SCell); and

An elapsed time after an RLF is detected in an SCell (timeSinceFailure-SCell).

Note that, in order to indicate a cause of detection of an RLF in an SCell, t3XY-Expiry (e.g., t312-Expiry) may be newly added to the causes of detection of an RLF in a PCell (i.e., the specification of the current LTE).

Figure 9:
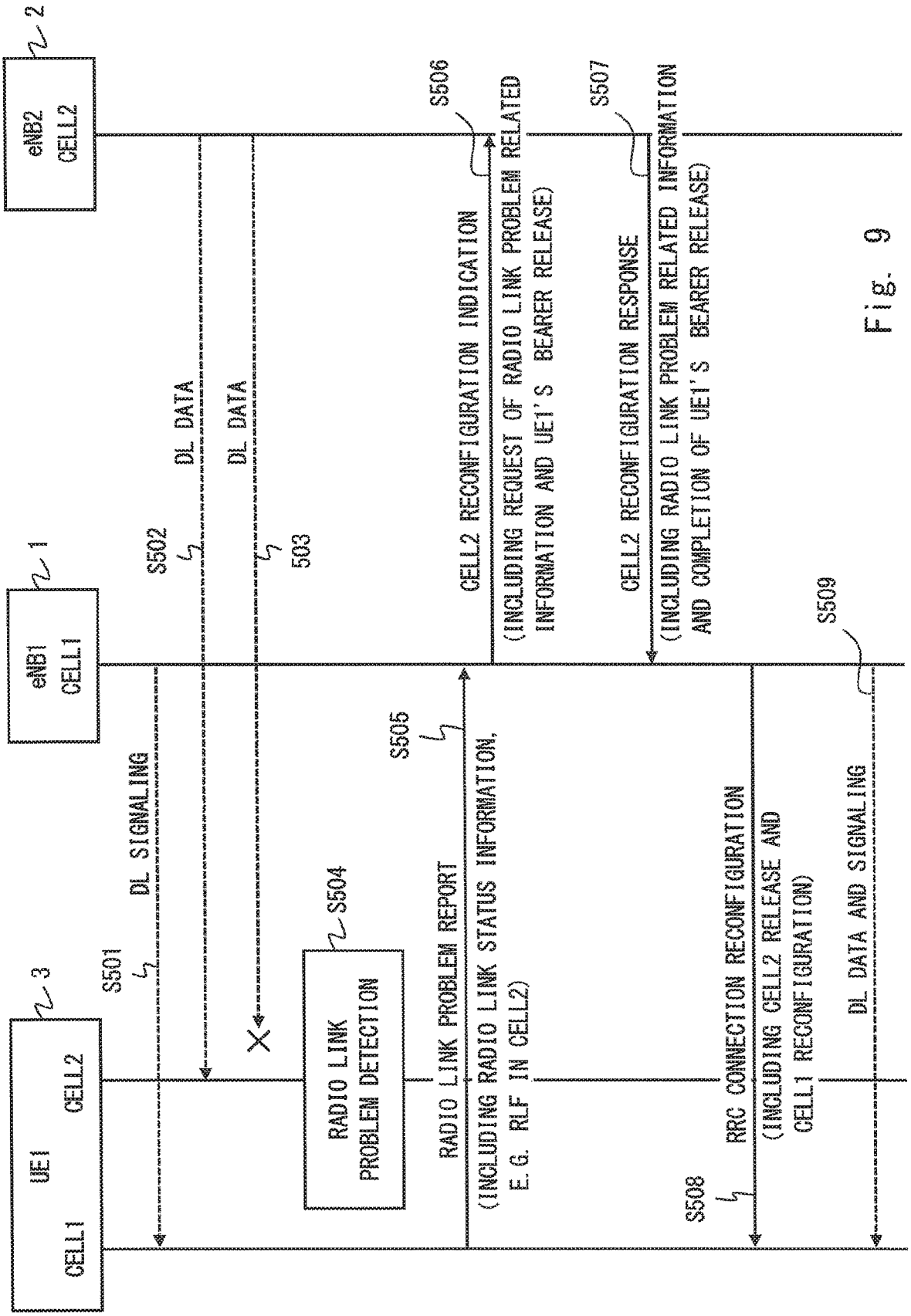
FIG. 9 is a sequence diagram showing an example of a communication control method in a radio communication system according to the second embodiment (Procedure Example 5)
Figure 10:
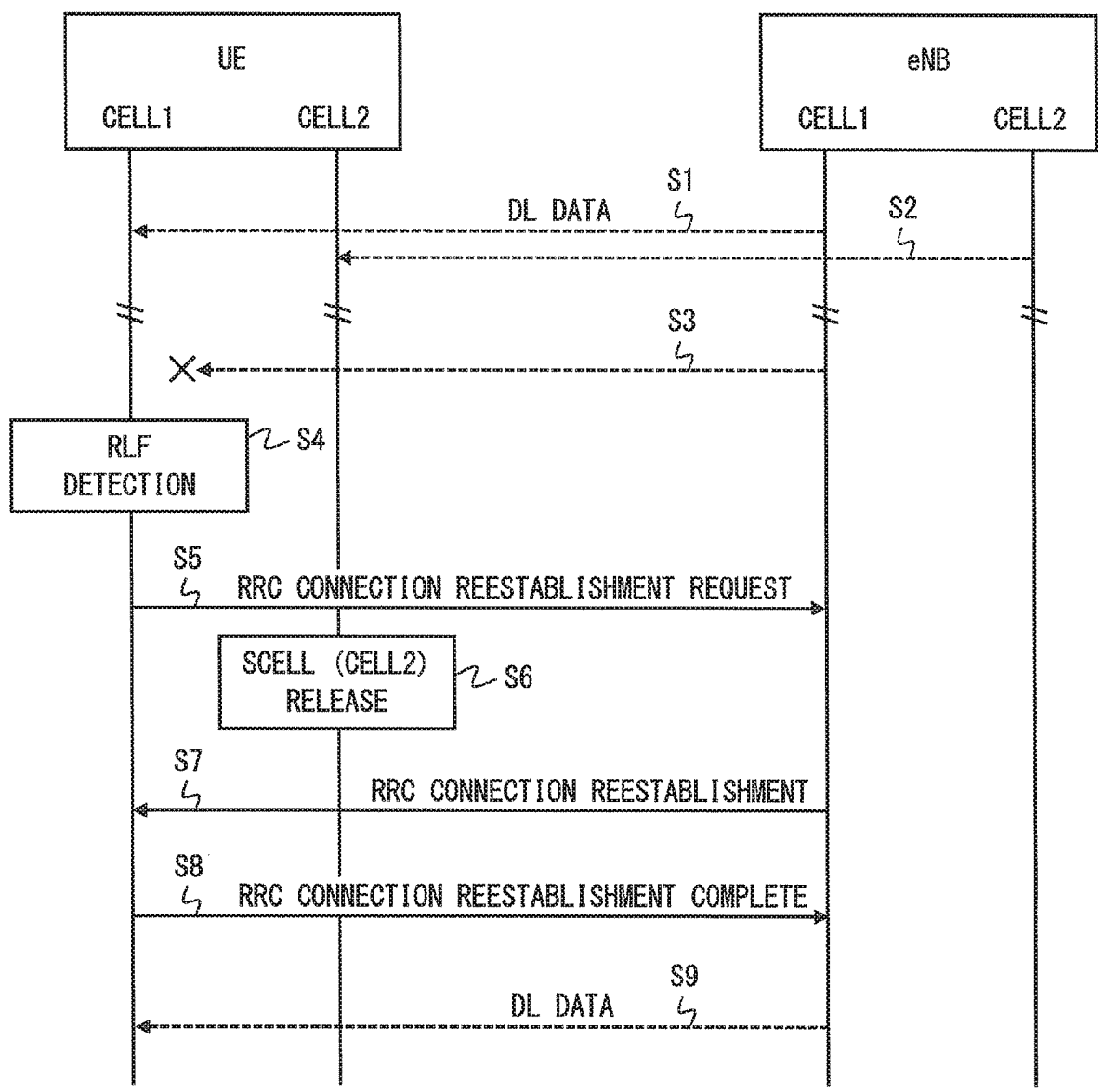
FIG. 10 is a sequence diagram showing a procedure for recovering a radio link in carrier aggregation according to the LTE (related-art).

FIG. 9 shows an example of a sequence diagram showing a communication control method according to the Procedure Example 5. Note that in FIG. 9, the Cell 10 (i.e., the PCell) and the Cell 20 (i.e., the SCell) are expressed as "CELL1" and "CELL2", respectively. Further, one UE 3 is expressed as "UE 1".

Processes in steps S901 to S404 in FIG. 9 are similar to those in the steps S301 to S304 in FIG. 7, which are explained above in the Procedure Example 3. In a step S505, the UE 3 reports the detection of the radio link problem to the eNB 1 as the radio link status information (Radio link problem report (including Radio link status information, e.g., RLF in CELL2)). In a step S506, the eNB 1 instructs the eNB 2 to transmit information about the radio link problem regarding the radio link with the UE 3 (UE 1 in FIG. 9), which has detected the radio link problem, and to release the bearer configured for that UE 3 (UE 1 in FIG. 9) (CELL2 reconfiguration indication (including request of Radio link problem related information and UE1's bearer release)). In a step S507, the eNB 2 releases the bearer for the UE 3 and reports the information about the radio link problem and the completion of the bearer release to the eNB 1 (CELL2 reconfiguration response (including Radio link problem related information and completion of UE1's bearer release)). Processes in the subsequent steps S508 and S509 are similar to those in the steps S308 and S309 in FIG. 7.

According to the procedure shown in FIG. 9, the eNB 1 can recognize the radio link problem occurring in the Cell 20 and can reduce (or prevent) packet losses and the like by appropriately coping with the problem.

(Modification of Procedure Example 5)

The procedure shown in FIG. 9 is merely an example of a case where information about a radio link problem in the Cell 20 is transmitted from the eNB 2 to the eNB 1. The Procedure Example 5 may be modified as follows.

Though it is not shown in FIG. 9, when the eNB 1 takes over the bearer configuration of the Cell 20 configured in the eNB 2 and uses it for the Cell 10, it is also necessary to reconfigure the core network (EPC) 4. The reconfiguration in the core network may be performed in accordance with the procedure shown in the Procedure Example 3.

Although FIG. 9 shows a case where a problem in downlink data transmission in the Cell 20 is coped with, a problem in the uplink data (UL data) transmission in the Cell 20 may be coped with in a similar manner.

FIG. 9 shows an example where the eNB 1 controls establishment of a radio link for the UE 3 in the Cell 10 in order to cope with a radio link problem in the Cell 20. However, the eNB 1 may transmit, to the UE 3 through the Cell 10, an instruction for recovering the radio link in the Cell 20 or an instruction for establishing a radio link in a cell different from both the Cell 10 and the Cell 20 (e.g., a third cell (CELL3)).

The UE 3 may transmit to the eNB 1 a request for configuration a cell, instead of the Cell 20, as a secondary cell (SCell), or a request to remove the Cell 20 from the SCell(s).

Other Embodiments

In the first and second embodiments, the transmission and reception of information (also called "messages") between the first and second radio stations 1 and 2 may be performed by using, for example, a direct interface such as an LTE X2 interface, or may be performed through an interface with a core network (e.g., EPC) 4 such as an LTE S1 interface.

The first and second embodiments can be applied to a case where the first radio station 1 (eNB 1) is a macro radio base station (Macro eNB (MeNB)) that serves (manages) a macro cell having a relatively large coverage and the second radio station 2 (eNB 2) is a low-power radio base station (Low Power Node (LPN)) that serves (manages) a cell having a small coverage. Examples of a LPN include a pico-radio base station (Pico eNB (PeNB)) having functions similar to those of the MeNB and a new type of network node (New Node) having fewer functions than those of the MeNB. Alternatively, it is conceivable to employ a configuration in which a MeNB manages a LPN and control functions (e.g., an RRC layer) in an LPN cell. Further, the second cell 20 may be a new type of cell (New Cell Type) which is different from conventional cells and uses a new type of carrier (New Carrier Type) different from conventional carriers.

Each of the communication control methods performed by the radio station 1 (communication control unit 15), the radio station 2 (communication control unit 25), and the radio terminal 3 (communication control unit 35) described in the first and second embodiments may be implemented by using a semiconductor processing device such as an Application Specific Integrated Circuit (ASIC). Alternatively, these methods may be implemented by causing a computer system including at least one processor (e.g., Microprocessor, Micro Processing Unit (MPU), or Digital Signal Processor (DSP)) to execute a program. Specifically, one or more programs including instructions for causing a computer system to perform algorithms shown in the flowcharts and the sequence diagrams may be created, and these programs may be supplied to a computer.

These programs can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, these programs can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

In the first and second embodiments, an LTE system has been mainly explained. However, these embodiments may be applied to radio communication systems other than the LTE system, such as a 3GPP Universal Mobile Telecommunications System (UMTS), a 3GPP2 CDMA2000 system (1×RTT, High Rate Packet Data (HRPD)), a Global System for Mobile Communications (GSM) system, and a WiMAX system.

Further, the above-described embodiments are merely examples for the application of the technical ideas obtained by the present inventors. Needless to say, these technical ideas are not limited to the above-described embodiments and various modifications can be made thereto.

This application is based upon and claims the benefit of priority from Japanese patent applications No. 2013-038971, filed on Feb. 28, 2013, the disclosure of which is incorporated herein in its entirety by reference.

REFERENCE SIGNS LIST

1 FIRST RADIO STATION
2 SECOND RADIO STATION
3 RADIO TERMINAL
10 FIRST CELL
20 SECOND CELL
15 COMMUNICATION CONTROL UNIT
25 COMMUNICATION CONTROL UNIT
35 COMMUNICATION CONTROL UNIT

The invention claimed is:

1. A radio communication system comprising:
a first radio station that serves a first cell;
a second radio station that serves a second cell; and
a radio terminal configured to perform Dual Connectivity using the first and second cells, wherein
the first radio station is configured to perform, with the radio terminal, radio resource control for the first and second cells in order to perform the Dual Connectivity, and
the second radio station is configured to transmit, to the first radio station, cause information that a radio link connection in the second cell between the second radio station and the radio terminal was lost while the Dual Connectivity is being performed, and a terminal identifier of the radio terminal.

2. The radio communication system according to claim 1, wherein the second radio station is configured to inform the first radio station, when the second radio station transmits the cause information, that the second radio station is expecting to release the radio link connection of the radio terminal from the second cell, or expecting to change the radio link connection of the radio terminal from the second cell to a third cell different from the second cell.

3. The radio communication system according to claim 2, wherein the first radio station is configured to release the radio link connection of the radio terminal in the second cell, or establish a radio link connection of the radio terminal in the third cell.

4. A first radio station that serves a first cell, comprising:
a memory storing instructions; and
at least one processor configured to process the instructions to:
support Dual Connectivity using the first cell and a second cell served by a second radio station,
perform, with a radio terminal, radio resource control for the first and second cells in order to perform the Dual Connectivity with the radio terminal, and
receive, from the second radio station, cause information that a radio link connection in the second cell between the second radio station and the radio terminal was lost while the Dual Connectivity is being performed, and a terminal identifier of the radio terminal.

5. The first radio station according to claim 4, wherein the at least one processor is configured to process the instructions to be informed, from the second radio station when the first radio station receives the cause information, that the second radio station is expecting to release the radio link connection of the radio terminal from the second cell, or expecting to change the radio link connection of the radio terminal from the second cell to a third cell different from the second cell.

6. The first radio station according to claim 5, wherein the at least one processor is configured to process the instructions to release the radio link connection of the radio terminal in the second cell, or establish a radio link connection of the radio terminal in the third cell.

7. A second radio station that serves a second cell, comprising:
a memory storing instructions; and
at least one processor configured to process the instructions to:
support Dual Connectivity using a first cell served by a first radio station and the second cell, and
transmit, to the first radio station, cause information that a radio link connection in the second cell between the second radio station and a radio terminal was lost while the Dual Connectivity is being performed by the radio terminal, and a terminal identifier of the radio terminal.

8. The second radio station according to claim 7, wherein the at least one processor is configured to process the instructions to inform the first radio station, when the second radio station transmits the cause information, that the second radio station is expecting to release the radio link connection of the radio terminal from the second cell, or expecting to change the radio link connection of the radio terminal from the second cell to a third cell different from the second cell.

9. The second radio station according to claim 8, wherein the radio link connection of the radio terminal in the second cell is released by the first radio station.

10. A communication control method in a first radio station that serves a first cell, the method comprising:
supporting Dual Connectivity using the first cell and a second cell served by a second radio station;
performing, with a radio terminal, radio resource control for the first and second cells in order to perform the Dual Connectivity with the radio terminal; and
receiving, from the second radio station, cause information that a radio link connection in the second cell between the second radio station and the radio terminal was lost while the Dual Connectivity is being performed, and a terminal identifier of the radio terminal.

11. The communication control method according to claim 10, further comprising:
being informed, from the second radio station when the first radio station receives the cause information, that the second radio station is expecting to release the radio link connection of the radio terminal from the second cell, or expecting to change the radio link connection of the radio terminal from the second cell to a third cell different from the second cell.

12. The communication control method according to claim 11, further comprising:
releasing the radio link connection of the radio terminal in the second cell, or establishing a radio link connection of the radio terminal in the third cell.

13. A communication control method in a second radio station that serves a second cell, the method comprising:
supporting Dual Connectivity using a first cell served by a first radio station and the second cell; and
transmitting, to the first radio station, cause information that a radio link connection in the second cell between the second radio station and a radio terminal was lost while the Dual Connectivity is being performed by the radio terminal, and a terminal identifier of the radio terminal.

14. The communication control method according to claim 13, further comprising;
informing the first radio station, when the second radio station transmits the cause information, that the second radio station is expecting to release the radio link connection of the radio terminal from the second cell, or expecting to change the radio link connection of the radio terminal from the second cell to a third cell different from the second cell.

15. The communication control method according to claim 14, wherein the radio link connection of the radio terminal in the second cell is released by the first radio station.

\* \* \* \* \*